(12) United States Patent
Kawauchi et al.

(10) Patent No.: US 8,045,658 B2
(45) Date of Patent: Oct. 25, 2011

(54) RECEPTION APPARATUS, RECEPTION METHOD AND PROGRAM

(75) Inventors: Hidetoshi Kawauchi, Kanagawa (JP); Tadaaki Yuba, Tokyo (JP); Tamotsu Ikeda, Tokyo (JP); Koji Naniwada, Tokyo (JP); Kazuhiro Shimizu, Kanagawa (JP); Lachlan Bruce Michael, Saitama (JP)

(73) Assignee: Sony Corporation, Tokyo (JP)

( * ) Notice: Subject to any disclaimer, the term of this patent is extended or adjusted under 35 U.S.C. 154(b) by 500 days.

(21) Appl. No.: 12/259,401

(22) Filed: Oct. 28, 2008

(65) Prior Publication Data

US 2009/0110127 A1    Apr. 30, 2009

(30) Foreign Application Priority Data

Oct. 30, 2007    (JP) ................................ P2007-282200

(51) Int. Cl.
    *H04L 27/06* (2006.01)
(52) U.S. Cl. ........................................................ 375/344

(58) Field of Classification Search ................... 375/260, 375/275, 316, 324, 340, 344, 350, 240.18; 370/210; 379/406.13; 708/404, 405; 342/196

See application file for complete search history.

(56) References Cited

U.S. PATENT DOCUMENTS

| 6,459,744 | B1 * | 10/2002 | Helard et al. | 375/354 |
| 6,993,083 | B1 * | 1/2006 | Shirakata et al. | 375/260 |
| 7,177,376 | B2 * | 2/2007 | Atungsiri et al. | 375/343 |
| 7,577,087 | B2 * | 8/2009 | Palin | 370/210 |
| 7,706,479 | B2 * | 4/2010 | Adachi | 375/340 |

FOREIGN PATENT DOCUMENTS

JP    2006 311385    11/2006

* cited by examiner

*Primary Examiner* — Sam K Ahn

(74) *Attorney, Agent, or Firm* — Frommer Lawrence & Haug LLP; William S. Frommer

(57) ABSTRACT

A reception apparatus includes: an extraction section; a transmission line characteristic estimation section; an estimation section; a frequency shift amount production section; a control section; an addition section; a first frequency shifting section; a second frequency shifting section; an interpolation section; a compensation section; a detection section; and an operation section.

5 Claims, 16 Drawing Sheets

F I G . 4
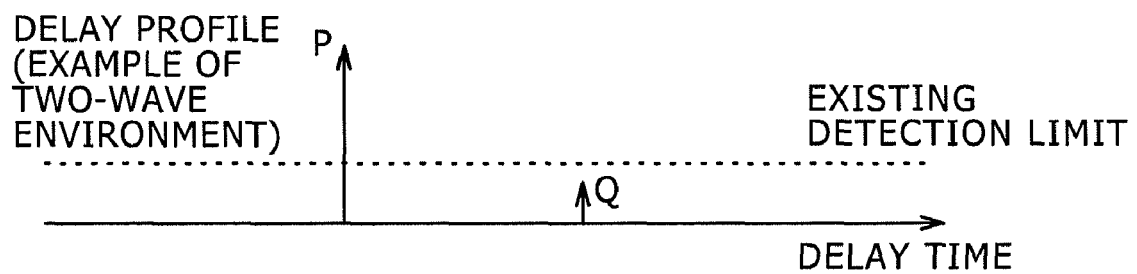

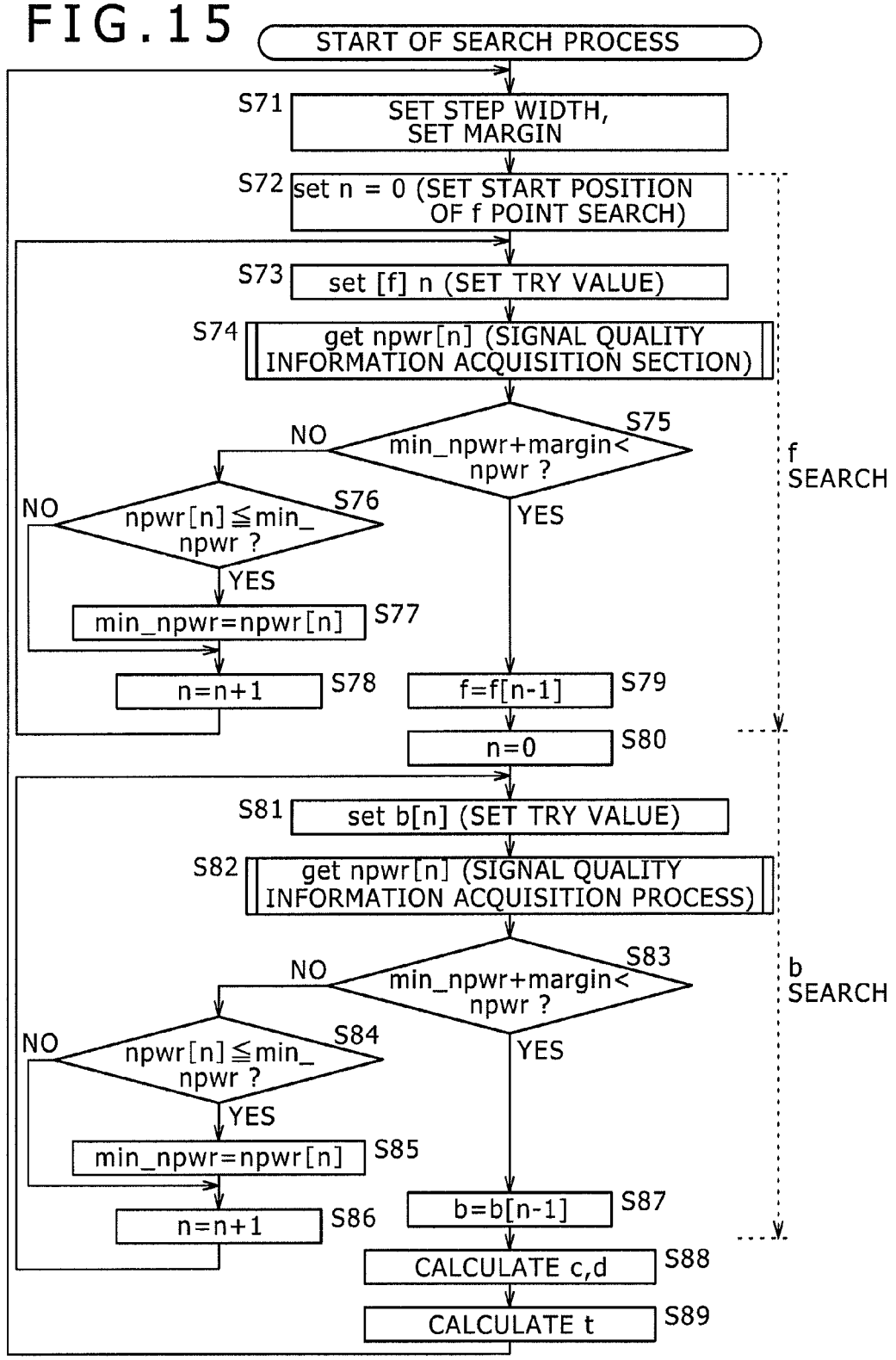

RECEPTION APPARATUS, RECEPTION METHOD AND PROGRAM

CROSS REFERENCES TO RELATED APPLICATIONS

The present invention contains subject matter related to Japanese Patent Application JP 2007-282200, filed in the Japan Patent Office on Oct. 30, 2007, the entire contents of which being incorporated herein by reference.

BACKGROUND OF THE INVENTION

1. Field of the Invention

This invention relates to a reception apparatus, a reception method and a program, and more particularly to a reception apparatus, a reception method and a program wherein a transmission line characteristic is estimated.

2. Description of the Related Art

As a modulation method for ground wave digital broadcasting, an orthogonal frequency division multiplexing (OFDM) method has been proposed wherein a large number of orthogonal carriers are used and modulated by PSK (Phase Shift Keying) or QAM (Quadrature Amplitude Modulation).

The OFDM method is characterized in that, since it divides an overall transmission frequency band with a large number of subcarriers, the frequency band width per one subcarrier is small, and although the transmission speed is comparatively low, the total transmission speed is similar to that of an existing modulation method.

The OFDM method is characterized further in that, since a large number of subcarriers are transmitted in parallel, the symbol speed is comparatively low. Therefore, the multi-path time length relative to the time length of one symbol is low, and consequently, the OFDM method is characterized also in that the influence of multi-paths is low.

Furthermore, the OFDM method is characterized in that, since data are allocated to a plurality of subcarriers, a transmission circuit can be configured using an IFFT (Inverse Fast Fourier Transform) operation circuit which performs, upon modulation, inverse Fourier transform, and a reception circuit can be configured using an FFT (Fast Fourier Transform) operation circuit which performs, upon demodulation, Fourier Transform.

From such characteristics as described above, the OFDM method is frequently applied to ground wave digital broadcasting which is influenced significantly by multi-path interference. As standards for ground wave digital broadcasting which adopt the OFDM method, such standards as, for example, the DVB-T (Digital Video Broadcasting-Terrestrial), ISDB-T (Integrated Services Digital Broadcasting-Terrestrial) and ISDB-TSB (Integrated Services Digital Broadcasting-Terrestrial for Sound Broadcasting) standards are available.

FIG. 1 illustrates an OFDM symbol.

In the OFDM method, transmission of a signal is performed in a unit called OFDM symbol.

Referring to FIG. 1, one OFDM symbol includes an effective symbol in a signal interval for which IFFT is performed upon transmission, and a guard interval (GI) within which a waveform of part of a rear half of the effective symbol is copied. The GI is inserted to a position just forwardly of the effective symbol on the time axis.

With the OFDM method, since a guard interval is inserted, interference between OFDM symbols which occurs under a multi-path environment can be prevented.

A plurality of such OFDM symbols are collected to form one OFDM transmission frame. For example, in the ISDB-T standards, one OFDM transmission frame is formed from 204 OFDM symbols. The insertion position of a pilot signal is determined with reference to a unit of an OFDM transmission frame.

In the OFDM method which uses a QAM type modulation method as a modulation method for subcarriers, if an influence of multi-paths or the like is exerted upon transmission, then the amplitudes and the phases upon transmission and those upon reception become different from each other for each subcarrier. Therefore, on the receiver side, there is a need to perform equalization of the signal so that the amplitude and the phase of the reception signal may become same as those of the transmission signal.

In the OFDM method, the sender side discretely inserts a pilot signal of a predetermined amplitude and a predetermined phase into transmission symbols. On the other hand, the receiver side determines a frequency characteristic of the transmission line based on the amplitude and the phase of the pilot signal and equalizes the reception signal based on the determined characteristic of the transmission line.

A pilot signal used for calculation of a transmission line characteristic in this manner is hereinafter referred to as scattered pilot signal or SP signal. FIG. 2 illustrates an arrangement pattern of a scattered pilot signal in OFDM symbols adopted in the DVB-T standards or the ISDB-T standards.

FIG. 3 shows an example of a configuration of an existing OFDM receiver.

The OFDM receiver 100 includes a reception antenna 1, a tuner 2, an analog/digital (A/D) conversion circuit 3, an orthogonal demodulation circuit 4, a carrier production circuit 5, an FFT circuit 6, an FFT interval control circuit 7, and a transmission line distortion compensation circuit 8. The OFDM receiver 100 further includes an error correction circuit 9, a delay profile estimation circuit 10, a frequency shift amount production circuit 11, and a frequency interpolation filter selection circuit 12.

The tuner 2 frequency converts an RF signal received by the reception antenna 1 into an IF signal and outputs the IF signal to the A/D conversion circuit 3.

The A/D conversion circuit 3 performs A/D conversion for the IF signal supplied thereto from the tuner 2 and outputs a resulting digital IF signal to the orthogonal demodulation circuit 4.

The orthogonal demodulation circuit 4 orthogonally modulates the digital IF signal supplied thereto from the A/D conversion circuit 3 using a carrier supplied thereto from the carrier production circuit 5 to acquire an OFDM signal of a baseband from the IF signal. The OFDM signal of the baseband is a signal in a time domain before an FFT operation is performed.

An OFDM signal of a baseband before an FFT operation is performed is hereinafter referred to as OFDM time domain signal. The OFDM time domain signal is orthogonally modulated into a composite signal including a real-axis component (I channel signal) and an imaginary-axis component (Q channel signal). The orthogonal demodulation circuit 4 outputs the time domain OFDM signal to the carrier production circuit 5, FFT circuit 6, FFT interval control circuit 7 and delay profile estimation circuit 10.

The carrier production circuit 5 produces a carrier of a predetermined frequency synchronized with the reception signal based on the time domain OFDM signal supplied thereto from the orthogonal demodulation circuit 4 and outputs the produced carrier to the orthogonal demodulation circuit 4.

The FFT circuit 6 removes a signal within a range of a GI from a signal of one OFDM symbol based on an FFT trigger pulse supplied thereto from the FFT interval control circuit 7 to extract a signal within a range of an effective symbol length.

Further, the FFT circuit 6 performs an FFT operation for the extracted OFDM time domain signal to extract data orthogonally modulated with subcarriers. In particular, the start position of an FFT operation by the FFT circuit 6 is a position within a range from a position A of FIG. 1 which is the boundary of an OFDM symbol to another position B which is the boundary position between the GI and the effective symbol of the OFDM symbol. The FFT operation range is called FFT interval, and the start position of the FFT interval is designated by an FFT trigger pulse supplied from the FFT interval control circuit 7.

The FFT circuit 6 outputs an OFDM signal representative of the extracted data to the transmission line distortion compensation circuit 8. The OFDM signal outputted from the FFT circuit 6 is a signal in a frequency domain after an FFT operation is performed. An OFDM signal after an FFT operation is performed is hereinafter referred to as OFDM frequency domain signal.

The FFT interval control circuit 7 determines an FFT interval based on the time domain OFDM signal supplied thereto from the orthogonal demodulation circuit 4 and a delay profile estimated by the delay profile estimation circuit 10 and outputs an FFT trigger pulse for designating a start position of the determined FFT interval to the FFT circuit 6.

The transmission line distortion compensation circuit 8 includes a reception signal frequency shift circuit 8-1, an SP extraction circuit 8-2, a temporal direction transmission line characteristic estimation circuit 8-3, a transmission line characteristic frequency shift circuit 8-4, a frequency interpolation circuit 8-5 and a division circuit 8-6.

The reception signal frequency shift circuit 8-1 performs frequency shifting of the OFDM frequency domain signal supplied thereto from the FFT circuit 6 in accordance with a shift amount produced by the frequency shift amount production circuit 11. The reception signal frequency shift circuit 8-1 outputs the OFDM frequency domain signal obtained by the frequency shifting to the division circuit 8-6.

The SP extraction circuit 8-2 extracts an SP signal from the frequency domain OFDM signal supplied thereto from the FFT circuit 6, and removes modulation components of the SP signal to estimate a transmission line characteristic of subcarriers at a disposed position of the SP signal. The SP extraction circuit 8-2 outputs a signal representative of the estimated transmission line characteristic to the temporal direction transmission line characteristic estimation circuit 8-3

The temporal direction transmission line characteristic estimation circuit 8-3 estimates a transmission line characteristic of subcarriers on which the SP signal is disposed at positions of OFDM symbols juxtaposed in the temporal direction, that is, the OFDM symbol direction, based on the transmission line characteristic estimated by the SP extraction circuit 8-2. In FIG. 2, the vertical direction is the temporal direction, and the horizontal direction is the frequency direction.

For example, the temporal direction transmission line characteristic estimation circuit 8-3 uses a transmission line characteristic at the position of an SP signal $SP_1$ of FIG. 2 estimated by the SP extraction circuit 8-2 and a transmission line characteristic at the position of another SP signal $SP_2$ to estimate a transmission line characteristic of the subcarrier at the positions of the other symbols in a region $A_1$ of FIG. 2.

Since an SP signal is inserted for every 12 subcarriers on the same time axis, the temporal direction transmission line characteristic estimation circuit 8-3 estimates a transmission line characteristic of a subcarrier at the positions of OFDM symbols for every three subcarriers. The temporal direction transmission line characteristic estimation circuit 8-3 outputs a signal representative of the transmission line characteristics of each three carriers to the transmission line characteristic frequency shift circuit 8-4 and delay profile estimation circuit 10. The signal representative of the transmission line characteristic outputted from the temporal direction transmission line characteristic estimation circuit 8-3 is represented, for example, as a signal on the frequency axis.

The transmission line characteristic frequency shift circuit 8-4 performs frequency shifting of the transmission line characteristic estimated by the temporal direction transmission line characteristic estimation circuit 8-3 in accordance with a shift amount produced by the frequency shift amount production circuit 11. Then, the transmission line characteristic frequency shift circuit 8-4 outputs a transmission line characteristic obtained by the frequency shifting to the frequency interpolation circuit 8-5.

The frequency interpolation circuit 8-5 performs a frequency interpolation process using an interpolation filter selected in accordance with a filter selection signal supplied thereto from the frequency interpolation filter selection circuit 12 to estimate a transmission line characteristic of a subcarrier at the position of each OFDM symbol in the frequency direction from the transmission line characteristic for each three subcarriers supplied from the transmission line characteristic frequency shift circuit 8-4. To the frequency interpolation circuit 8-5, a plurality of interpolation filters having predetermined bandwidths are provided, and an interpolation filter to be used for a frequency interpolation process is selected from the plural interpolation filters.

For example, the frequency interpolation circuit 8-5 estimates a transmission line characteristic of a subcarrier at the position of an OFDM symbol for which estimation of the transmission line characteristic is not performed as yet from among the positions of the OFDM symbols included in a region $A_2$ in FIG. 2. The estimation of the transmission line characteristic is performed using a transmission line characteristic estimated already by the SP extraction circuit 8-2 and the temporal direction transmission line characteristic estimation circuit 8-3.

As a result, transmission line characteristics of all subcarriers at the positions of the OFDM symbols are estimated. The frequency interpolation circuit 8-5 outputs a signal representative of the estimated transmission line characteristics to the division circuit 8-6.

The division circuit 8-6 divides components of the signal which represent transmission line characteristics of all subcarriers supplied from the frequency interpolation circuit 8-5 from the OFDM frequency domain signal supplied thereto from the reception signal frequency shift circuit 8-1 and removes components of distortion by the transmission line from the OFDM frequency region signal. The division circuit 8-6 outputs the frequency domain OFDM signal from which the distortion components are removed to the error correction circuit 9.

The error correction circuit 9 performs a deinterleave process for a signal interleaved by the sender side and further performs such processes as depuncture, Viterbi decoding, diffusion signal removal and RS decoding. The error correction circuit 9 outputs data obtained by the processes as decoded data to a circuit on the following stage.

The delay profile estimation circuit 10 determines a temporal response characteristic of the transmission line to estimate a delay profile of the transmission line. For example, the delay profile estimation circuit 10 performs IFFT for the transmission line characteristic estimated by the temporal direction transmission line characteristic estimation circuit 8-3 to estimate a delay profile. The transmission line characteristic estimated by the temporal direction transmission line characteristic estimation circuit 8-3 is a frequency characteristic, and by performing IFFT for the transmission line characteristic, the determined temporal response characteristic becomes a delay profile.

The delay profile estimation circuit 10 outputs the delay profile to the FFT interval control circuit 7, frequency shift amount production circuit 11 and frequency interpolation filter selection circuit 12. It is to be noted that, as a method for delay profile estimation, also a method is known wherein a matched filter (MF) whose tap coefficient is a guard interval is utilized to estimate a delay profile from an OFDM time domain signal.

The frequency shift amount production circuit 11 produces a shift amount for use for frequency shifting based on the delay profile estimated by the delay profile estimation circuit 10. For example, the frequency shift amount production circuit 11 produces a shift amount with which the center position in the time axis direction of the path included in the delay profile (the center position of the delay spread) comes to the center position when the frequency band of the interpolation filter of the frequency interpolation circuit 8-5 is represented on the time axis.

The frequency shift amount production circuit 11 outputs a signal representative of the produced shift amount to the reception signal frequency shift circuit 8-1 and the transmission line characteristic frequency shift circuit 8-4.

The reception signal frequency shift circuit 8-1 performs frequency shifting in accordance with the shift amount produced by the frequency shift amount production circuit 11 such that the frequency band of the OFDM frequency domain signal supplied from the FFT circuit 6 is included in the frequency band of the interpolation filter. Meanwhile, the transmission line characteristic frequency shift circuit 8-4 performs frequency shifting such that the frequency band of the signal representative of the transmission line characteristic supplied from the temporal direction transmission line characteristic estimation circuit 8-3 is included in the frequency band of the interpolation filter.

The frequency interpolation filter selection circuit 12 determines a delay spread based on the delay profile estimated by the delay profile estimation circuit 10 to select an interpolation filter corresponding to the delay spread from among the interpolation filters provided to the frequency interpolation circuit 8-5. The frequency interpolation filter selection circuit 12 outputs a filter selection signal which designates the selected interpolation filter to the frequency interpolation circuit 8-5.

A similar reception apparatus is disclosed in Japanese Patent Laid-open No. 2006-311385.

SUMMARY OF THE INVENTION

As described above, an estimated delay profile is used for determination of an FFT interval by the FFT interval control circuit 7, production of a shift amount by the frequency shift amount production circuit 11 and selection of an interpolation filter by the frequency interpolation filter selection circuit 12.

Accordingly, since a delay profile cannot be estimated correctly in a multi-path environment wherein such a path as exceeds a detection limit and cannot be detected exists, a frequency shift amount is sometimes produced in error or an interpolation filter is sometimes selected in error. Since distortion of the transmission line cannot be compensated for fully, the reception performance is deteriorated. Further, as another problem, an optimum FFT trigger position is sometimes determined in error. This causes interference between symbols and deteriorates the reception performance.

FIG. 4 illustrates an example of a delay profile in a two-wave environment. In FIG. 4, the axis of abscissa indicates the delay time, and the axis of ordinate indicates the power of the path.

In the example of FIG. 4, two paths including a path P and another path Q exist, and only the path P can be detected while the path Q cannot be detected because the power thereof is excessively low.

In this instance, since only the path P can be detected, although a delay spread corresponding to distance between the path P and the path Q actually exists, it is decided as being zero, and selection of an interpolation filter and so forth are performed based on the wrong decision.

Therefore, it is demanded to provide a reception apparatus, a reception method and a program wherein a transmission line characteristic can be estimated with a high degree of accuracy to prevent otherwise possible deterioration of the reception performance.

According to an embodiment of the present invention, there is provided a reception apparatus including an extraction section configured to extract a pilot signal from a frequency domain OFDM signal, and a transmission line characteristic estimation section configured to estimate a transmission line characteristic in a temporal direction based on the pilot signal extracted by the extraction section and produce a transmission line characteristic signal representative of the estimated transmission line characteristic. The apparatus further includes a estimation section configured to estimate a delay profile from the transmission line characteristic signal produced by the transmission line characteristic estimation section, a frequency shift amount production section configured to produce a frequency shift amount based on the delay profile estimated by the estimation section and a frequency band of an interpolation filter to be used in a frequency interpolation process, and a control section configured to produce a shift amount offset representing a predetermined shift amount. The apparatus still further includes an addition section configured to add the frequency shift amount produced by the frequency shift amount production section and the shift amount offset produced by the control section to produce a trial shift amount, a first frequency shifting section configured to perform frequency shifting of the frequency domain OFDM signal in accordance with the trial shift amount produced by the addition section, a second frequency shifting section configured to perform frequency shifting of the transmission line characteristic signal in accordance with the trial shift amount produced by the addition section, and an interpolation section configured to perform a frequency interpolation process for the transmission line characteristic signal frequency-shifted by the second frequency shifting section using the interpolation filter to produce a signal representative of the transmission line characteristics of all subcarriers. The apparatus still further includes a compensation section configured to produce, based on the frequency domain OFDM signal frequency-shifted by the first frequency shifting section and the signal produced by the frequency interpolation process of the interpolation section, a transmission line distortion compensated signal in the form of a signal from which components of distortion of a transmission line are removed, a detection section configured to detect a noise amount included in the transmission line distortion compensated signal produced by the compensation section, and an operation section configured to perform an FFT operation for a time domain OFDM signal to produce the frequency domain OFDM signal. The control section is operable, when the position of the earliest incoming wave on the time axis cannot be detected from the delay profile estimated by the estimation section, to detect an interval of the shift amount offset within which the noise amount detected by the detection section is minimum, detect a shift amount offset which exhibits a maximum value within the interval with reference to a center position of the delay spread which can be detected based on the delay profile and estimate the position of the earliest incoming wave on the time axis from the detected maximum shift amount offset and the frequency band of the interpolation filter used by the interpolation section to set a start position of the FFT operation by the operation section.

The control section may set, as the start position of the FFT operation, the position on the time axis corresponding to a value obtained by an expression f−BW/2 where f is the detected maximum shift amount offset and BW is the width when the frequency band of the interpolation filter used by the interpolation section on the time axis.

According to another embodiment of the present invention, there are provided a reception method and a program for causing a computer to execute a process including the steps of extracting a pilot signal from a frequency domain OFDM signal, estimating a transmission line characteristic in a temporal direction based on the extracted pilot signal and producing a transmission line characteristic signal representative of the estimated transmission line characteristic, estimating a delay profile from the transmission line characteristic signal, and producing a frequency shift amount based on the estimated delay profile and a frequency band of an interpolation filter to be used in a frequency interpolation process. The process further includes the steps of producing a shift amount offset representing a predetermined shift amount, adding the frequency shift amount and the shift amount offset to produce a trial shift amount, performing frequency shifting of the frequency domain OFDM signal in accordance with the trial shift amount, performing frequency shifting of the transmission line characteristic signal in accordance with the trial shift amount, and performing a frequency interpolation process for the frequency-shifted transmission line characteristic signal using the interpolation filter to produce a signal representative of the transmission line characteristics of all subcarriers. The process further includes the steps of producing, based on the frequency-shifted frequency domain OFDM signal and the signal produced by the frequency interpolation process, a transmission line distortion compensated signal in the form of a signal from which components of distortion of a transmission line are removed, detecting a noise amount included in the produced transmission line distortion compensated signal, performing an FFT operation for a time domain OFDM signal to produce the frequency domain OFDM signal, and detecting, when the position of the earliest incoming wave on the time axis cannot be detected from the estimated delay profile, an interval of the shift amount offset within which the detected noise amount is minimum, detecting a shift amount offset which exhibits a maximum value within the interval with reference to a center position of the delay spread which can be detected based on the delay profile and estimating the position of the earliest incoming wave on the time axis from the detected maximum shift amount offset and the frequency band of the interpolation filter to set a start position of the FFT operation.

In the reception apparatus and method and the program, a pilot signal is extracted from a frequency domain OFDM signal, and a transmission line characteristic in a temporal direction is estimated based on the extracted pilot signal and a transmission line characteristic signal representative of the estimated transmission line characteristic is produced. Then, a delay profile is estimated from the transmission line characteristic signal, and a frequency shift amount is produced based on the estimated delay profile and a frequency band of an interpolation filter to be used in a frequency interpolation process. Then, a shift amount offset representing a predetermined shift amount is produced, and the frequency shift amount and the shift amount offset are added to produce a trial shift amount. Thereafter, frequency shifting of the frequency domain OFDM signal is performed in accordance with the trial shift amount, and frequency shifting of the transmission line characteristic signal is performed in accordance with the trial shift amount. Further, a frequency interpolation process for the frequency-shifted transmission line characteristic signal is performed using the interpolation filter to produce a signal representative of the transmission line characteristics of all subcarriers. Then, based on the frequency-shifted frequency domain OFDM signal and the signal produced by the frequency interpolation process, a transmission line distortion compensated signal in the form of a signal from which components of distortion of a transmission line are removed is produced. Then, a noise amount included in the produced transmission line distortion compensated signal is detected. Thereafter, when the position of the earliest incoming wave on the time axis cannot be detected from the estimated delay profile, an interval of the shift amount offset within which the detected noise amount is minimum is detected, and a shift amount offset which exhibits a maximum value within the interval with reference to a center position of the delay spread which can be detected based on the delay profile is detected. Finally, the position of the earliest incoming wave on the time axis is estimated from the detected maximum shift amount offset and the frequency band of the interpolation filter to set a start position of the FFT operation.

With the reception apparatus and method and the program, a transmission line characteristic can be estimated with a high degree of accuracy to prevent otherwise possible deterioration of the reception performance.

The above and other features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 4 is a diagrammatic view illustrating an example of a delay profile;

FIG. 15 is a flow chart illustrating another calculation method of the OFDM receiver of FIG. 5.

DETAILED DESCRIPTION OF THE PREFERRED EMBODIMENT

Figure 1:
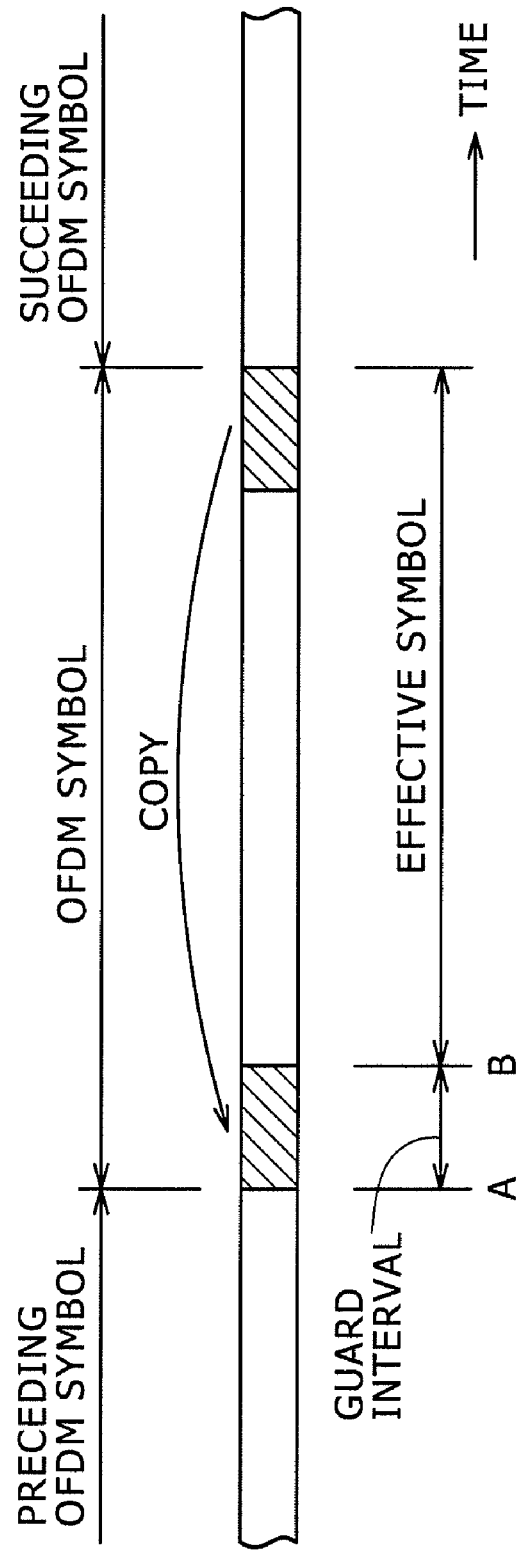
FIG. 1 is a diagrammatic view showing an OFDM symbol.
Figure 2:
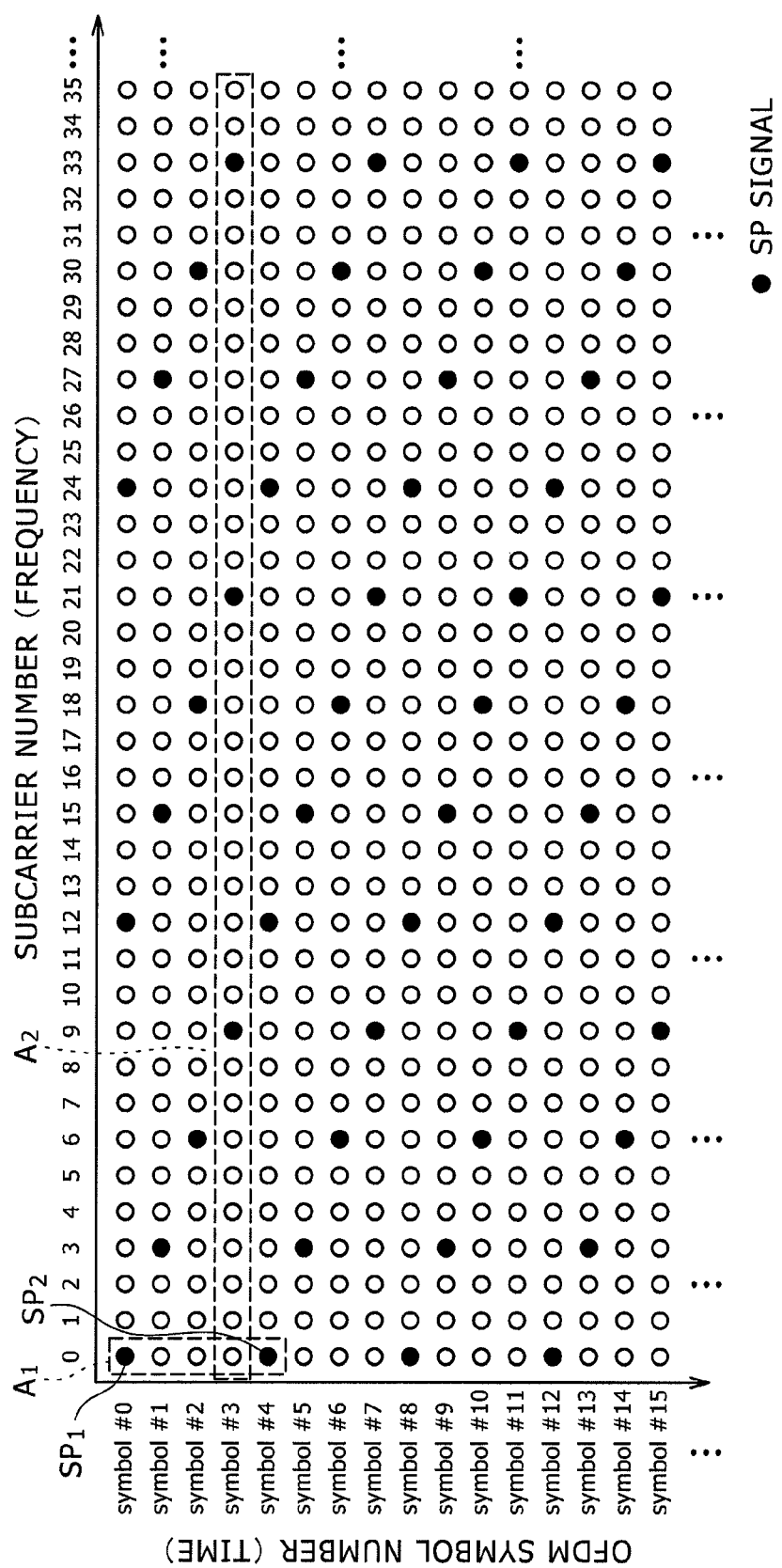
FIG. 2 is a view illustrating an example of arrangement of SP signals.
Figure 3:
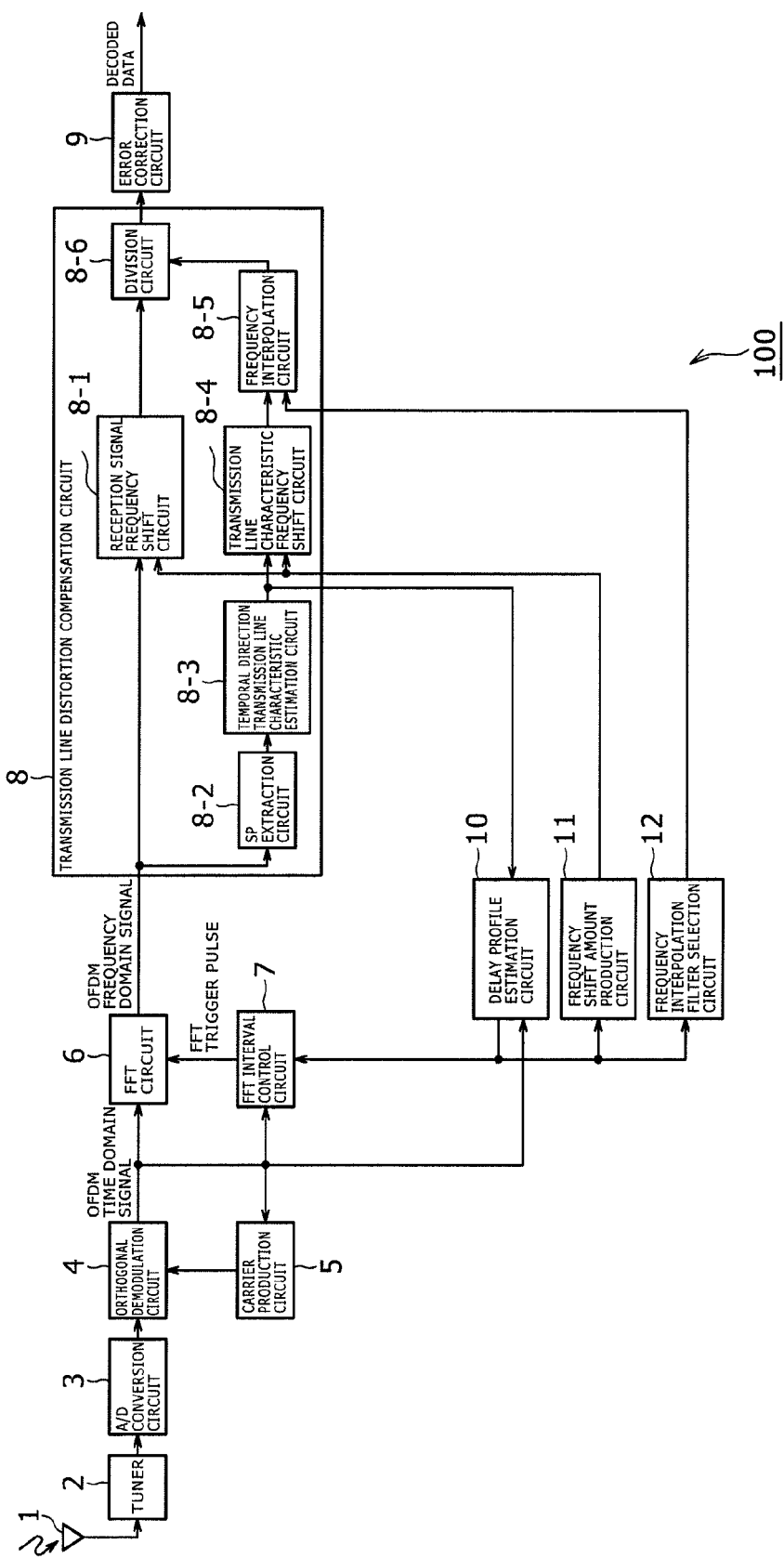
FIG. 3 is a block diagram showing an example of a configuration of an existing OFDM receiver.
Figure 5:
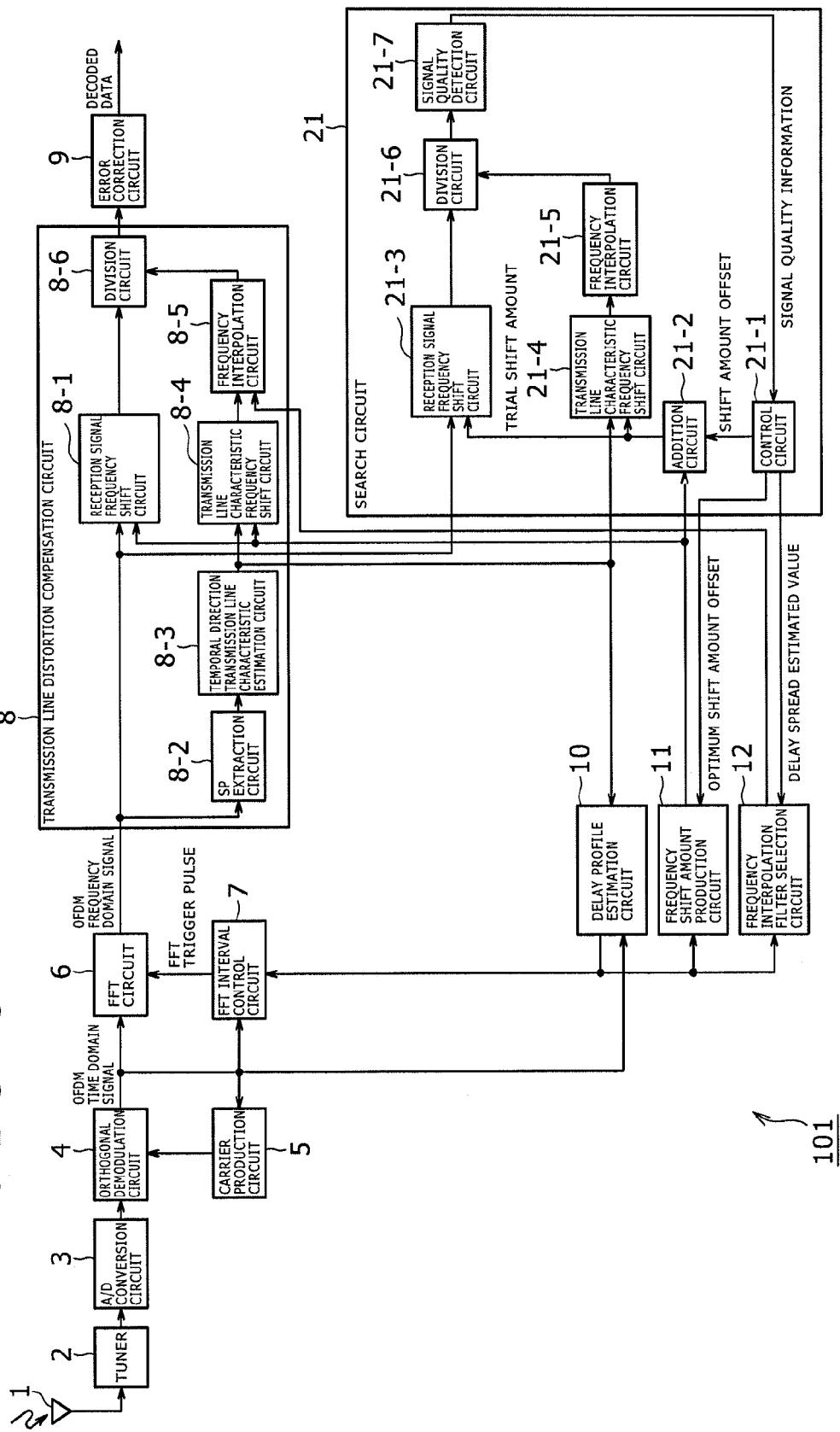
FIG. 5 is a block diagram showing an example of a configuration of an OFDM receiver to which the present invention is applied.

Referring to FIG. 5, there is shown an example of a configuration of an OFDM receiver to which the present invention is applied. In FIG. 5, like elements to those of FIG. 3 are denoted by like reference characters.

The OFDM receiver 101 includes a reception antenna 1, a tuner 2, an A/D conversion circuit 3, an orthogonal demodulation circuit 4, a carrier production circuit 5, an FFT circuit 6, an FFT interval control circuit 7, a transmission line distortion compensation circuit 8, an error correction circuit 9, a delay profile estimation circuit 10, a frequency shift amount production circuit 11, a frequency interpolation filter selection circuit 12 and a search circuit 21.

The OFDM receiver 101 is different from the OFDM receiver 100 described hereinabove with reference to FIG. 3 in that it additionally includes the search circuit 21.

The tuner 2 frequency converts an RF signal received by the reception antenna 1 into an IF signal and outputs the IF signal to the A/D conversion circuit 3.

The A/D conversion circuit 3 performs A/D conversion for the IF signal supplied thereto from the tuner 2 and outputs a resulting digital IF signal to the orthogonal demodulation circuit 4.

The orthogonal demodulation circuit 4 orthogonally modulates the digital IF signal supplied thereto from the A/D conversion circuit 3 using a carrier supplied thereto from the carrier production circuit 5 to acquire a time domain OFDM signal from the IF signal. The orthogonal demodulation circuit 4 outputs the time domain OFDM signal to the carrier production circuit 5, FFT circuit 6, FFT interval control circuit 7 and delay profile estimation circuit 10.

The carrier production circuit 5 produces a carrier of a predetermined frequency based on the time domain OFDM signal supplied thereto from the orthogonal demodulation circuit 4 and outputs the produced carrier to the orthogonal demodulation circuit 4.

The FFT circuit 6 removes a signal within a range of a GI from a signal of one OFDM symbol based on a FFT trigger pulse supplied thereto from the FFT interval control circuit 7 to extract a signal within a range of an effective symbol length.

Further, the FFT circuit 6 performs an FFT operation for the extracted OFDM time domain signal to extract data orthogonally modulated with subcarriers. The FFT circuit 6 outputs an OFDM frequency domain signal representative of the extracted data to the reception signal frequency shift circuit 8-1 and the SP extraction circuit 8-2 of the transmission line distortion compensation circuit 8 and a reception signal frequency shift circuit 21-3 of the search circuit 21.

The FFT interval control circuit 7 determines an FFT interval based on the time domain OFDM signal supplied thereto from the orthogonal demodulation circuit 4 and a delay profile estimated by the delay profile estimation circuit 10 and outputs an FFT trigger pulse for designating a start position of the determined FFT interval to the FFT circuit 6.

Where the FFT interval is determined using the time domain OFDM signal, the FFT interval control circuit 7 detects correlation values between a portion of a rear half of an effective symbol used as a copy source of the GI in the time domain OFDM signal of one OFDM symbol with different portions and detects a portion having a high correlation value as a GI. The FFT interval control circuit 7 determines the boundary position between the detected GI and the effective symbol as a start position of an FFT interval.

On the other hand, where the FFT interval is determined using a delay file, the FFT interval control circuit 7 determines the boundary position between the GI and the effective symbol represented by the delay profile as a start position of the FFT interval.

The transmission line distortion compensation circuit 8 includes a reception signal frequency shift circuit 8-1, an SP extraction circuit 8-2, a temporal direction transmission line characteristic estimation circuit 8-3, a transmission line characteristic frequency shift circuit 8-4, a frequency interpolation circuit 8-5 and a division circuit 8-6.

The reception signal frequency shift circuit 8-1 performs frequency shifting of the OFDM frequency domain signal supplied thereto from the FFT circuit 6 in accordance with a shift amount produced by the frequency shift amount production circuit 11. The reception signal frequency shift circuit 8-1 outputs the OFDM frequency domain signal obtained by the frequency shifting to the division circuit 8-6.

The SP extraction circuit 8-2 extracts an SP signal from the frequency domain OFDM signal supplied thereto from the FFT circuit 6, and removes modulation components of the SP signal to estimate a transmission line characteristic of a subcarrier at a disposed position of the SP signal. The SP extraction circuit 8-2 outputs an estimated signal representative of the transmission line characteristic to the temporal direction transmission line characteristic estimation circuit 8-3.

The temporal direction transmission line characteristic estimation circuit 8-3 estimates a transmission line characteristic of a subcarrier on which the SP signal is disposed at a position of each OFDM symbol in the temporal direction based on the transmission line characteristic estimated by the SP extraction circuit 8-2. The temporal direction transmission line characteristic estimation circuit 8-3 outputs a signal representative of the transmission line characteristic of each three carriers to the transmission line characteristic frequency shift circuit 8-4, delay profile estimation circuit 10, and transmission line characteristic frequency shift circuit 21-4 of the search circuit 21. The signal representative of the transmission line characteristic outputted from the temporal direction transmission line characteristic estimation circuit 8-3 is represented, for example, as a signal on the frequency axis.

The transmission line characteristic frequency shift circuit 8-4 performs frequency shifting of the transmission line characteristic estimated by the temporal direction transmission line characteristic estimation circuit 8-3 in accordance with a shift amount produced by the frequency shift amount production circuit 11. Then, the transmission line characteristic frequency shift circuit 8-4 outputs a transmission line characteristic obtained by the frequency shifting to the frequency interpolation circuit 8-5.

The frequency interpolation circuit 8-5 performs a frequency interpolation process using an interpolation filter selected in accordance with a filter selection signal supplied thereto from the frequency interpolation filter selection circuit 12 to estimate a transmission line characteristic of a subcarrier at the position of each OFDM symbol in the frequency direction from the transmission line characteristic for each three subcarriers supplied from the transmission line characteristic frequency shift circuit 8-4. To the frequency interpolation circuit 8-5, a plurality of interpolation filters having predetermined bandwidths are provided, and an interpolation filter to be used for a frequency interpolation process is selected from among the plural interpolation filters.

The frequency interpolation circuit 8-5 outputs a signal representative of the estimated transmission line characteristic to the division circuit 8-6.

The division circuit 8-6 divides components of the signal which represent transmission line characteristics of all subcarriers supplied from the frequency interpolation circuit 8-5 from the OFDM frequency domain signal supplied thereto from the reception signal frequency shift circuit 8-1 and removes components of distortion by the transmission line from the OFDM frequency region signal. The division circuit 8-6 outputs the frequency domain OFDM signal from which the distortion components are removed to the error correction circuit 9.

The error correction circuit 9 performs a deinterleave process for a signal interleaved by the sender side and further performs such processes as depuncture, Viterbi decoding, diffusion signal removal and RS decoding. The error correction circuit 9 outputs data obtained by the processes as decoded data to a circuit on the following stage.

The delay profile estimation circuit 10 determines a temporal response characteristic of the transmission line to estimate a delay profile of the transmission line, and outputs the estimated delay profile to the FFT interval control circuit 7, frequency shift amount production circuit 11 and frequency interpolation filter selection circuit 12.

The frequency shift amount production circuit 11 produces a shift amount based on the delay profile estimated by the delay profile estimation circuit 10 and an optimum shift amount offset supplied thereto from the control circuit 21-1 of the search circuit 21.

For example, the frequency shift amount production circuit 11 produces a shift amount by adding the optimum shift amount offset to a shift amount with which the center position in the time axis direction of the path included in a result of the estimation of a delay file comes to the center position of the region when the frequency band of the interpolation filter of the frequency interpolation circuit 8-5 is represented on the time axis.

The frequency shift amount production circuit 11 outputs a signal representative of the produced shift amount to the reception signal frequency shift circuit 8-1, the transmission line characteristic frequency shift circuit 8-4, and a addition circuit 21-2 of the search circuit 21.

The frequency interpolation filter selection circuit 12 uses a delay profile estimated by the delay profile estimation circuit 10 and a delay spread estimation value supplied thereto from a control circuit 21-1 to select a predetermined interpolation filter from among the interpolation filters provided to the frequency interpolation circuit 8-5. Where a delay spread estimation value is supplied from the control circuit 21-1, for example, the frequency interpolation filter selection circuit 12 selects an interpolation filter corresponding to the delay spread estimation value.

The frequency interpolation filter selection circuit 12 outputs a filter selection signal which designates the selected interpolation filter to the frequency interpolation circuit 8-5.

The search circuit 21 includes a control circuit 21-1, an addition circuit 21-2, a reception signal frequency shift circuit 21-3, a transmission line characteristic frequency shift circuit 21-4, a frequency interpolation circuit 21-5, a division circuit 21-6 and a signal quality detection circuit 21-7.

The control circuit 21-1 produces a shift amount offset representative of a predetermined shift amount of a frequency and outputs the produced shift amount offset to the addition circuit 21-2. Further, the control circuit 21-1 updates the shift amount offset successively by a predetermined width, and calculates an optimum shift amount offset based on signal quality information supplied from the signal quality detection circuit 21-7. The control circuit 21-1 outputs the optimum shift amount offset to the frequency shift amount production circuit 11.

The control circuit 21-1 calculates a delay spread estimation value in a process of calculating the optimum shift amount offset and outputs the calculated delay spread estimation value to the frequency interpolation filter selection circuit 12.

The addition circuit 21-2 produces a trial shift amount by adding the shift amount offset supplied from the control circuit 21-1 to the shift amount produced by the frequency shift amount production circuit 11. This trial shift amount is used to acquire an OFDM frequency domain signal after compensation for distortion of the transmission line which is an object of detection of the quality. The production of the trial shift amount is repeated every time a shift amount offset is supplied from the control circuit 21-1.

The addition circuit 21-2 outputs the trial shift amount to the reception signal frequency shift circuit 21-3 and the transmission line characteristic frequency shift circuit 21-4.

The reception signal frequency shift circuit 21-3 performs a process similar to that of the reception signal frequency shift circuit 8-1 of the transmission line distortion compensation circuit 8. Meanwhile, the transmission line characteristic frequency shift circuit 21-4 performs a process similar to that of the transmission line characteristic frequency shift circuit 8-4 of the transmission line distortion compensation circuit 8. However, a different shift amount is used in the processes.

In particular, the reception signal frequency shift circuit 21-3 performs frequency shifting of the OFDM frequency domain signal supplied thereto from the FFT circuit 6 in accordance with the trial shift amount produced by the addition circuit 21-2. The reception signal frequency shift circuit 21-3 outputs the OFDM frequency domain signal obtained by performing the frequency shifting to the division circuit 21-6.

The transmission line characteristic frequency shift circuit 21-4 performs frequency shifting of the transmission line characteristic estimated by the temporal direction transmission line characteristic estimation circuit 8-3 in accordance with the trial shift amount produced by the addition circuit 21-2. The transmission line characteristic frequency shift circuit 21-4 outputs the transmission line characteristic obtained by the frequency shifting to the frequency interpolation circuit 21-5.

The frequency interpolation circuit 21-5 performs a frequency interpolation process using an interpolation filter of a frequency band to estimate a transmission path characteristic of all subcarriers at the position of each OFDM symbol from the transmission line characteristic supplied from the transmission line characteristic frequency shift circuit 21-4. The frequency interpolation circuit 21-5 outputs a signal representative of the transmission path characteristics of all of the subcarriers to the division circuit 21-6.

The division circuit 21-6 divides components of a signal representative of the transmission line characteristics of all of the subcarriers supplied from the frequency interpolation circuit 21-5 from the OFDM frequency domain signal supplied from the reception signal frequency shift circuit 21-3 to remove components of distortion by the transmission line from the OFDM frequency domain signal.

The division circuit 21-6 outputs the frequency domain OFDM signal, from which the components of distortion are removed, to the signal quality detection circuit 21-7. In the following description, a frequency domain OFDM signal from which components of distortion of the transmission line are removed is referred to suitably as transmission line distortion compensated signal.

The signal quality detection circuit 21-7 detects the amount of noise included in the transmission line distortion compensated signal supplied thereto from the division circuit 21-6 and outputs information representative of the detected noise amount as signal quality information to the control circuit 21-1.

It is to be noted that the reception signal frequency shift circuit 8-1 of the transmission line distortion compensation circuit 8 and the reception signal frequency shift circuit 21-3 of the search circuit 21 perform a same process and may be implemented collectively as a single circuit.

Meanwhile, the transmission line characteristic frequency shift circuit 8-4 of the transmission line distortion compensation circuit 8 and the transmission line characteristic frequency shift circuit 21-4 of the search circuit 21 perform a same process and may be implemented collectively as a single circuit.

Further, the division circuit 8-6 of the transmission line distortion compensation circuit 8 and the division circuit 21-6 of the search circuit 21 perform a same process and may be implemented collectively as a single circuit.

The frequency interpolation circuit 21-5 of the search circuit 21 may be collectively implemented as a single circuit together with the frequency interpolation circuit 8-5 of the transmission line distortion compensation circuit 8, or may be implemented by a circuit formed from that one of the plural interpolation filters of the frequency interpolation circuit 8-5 to which a maximum band is provided.

Figure 6:
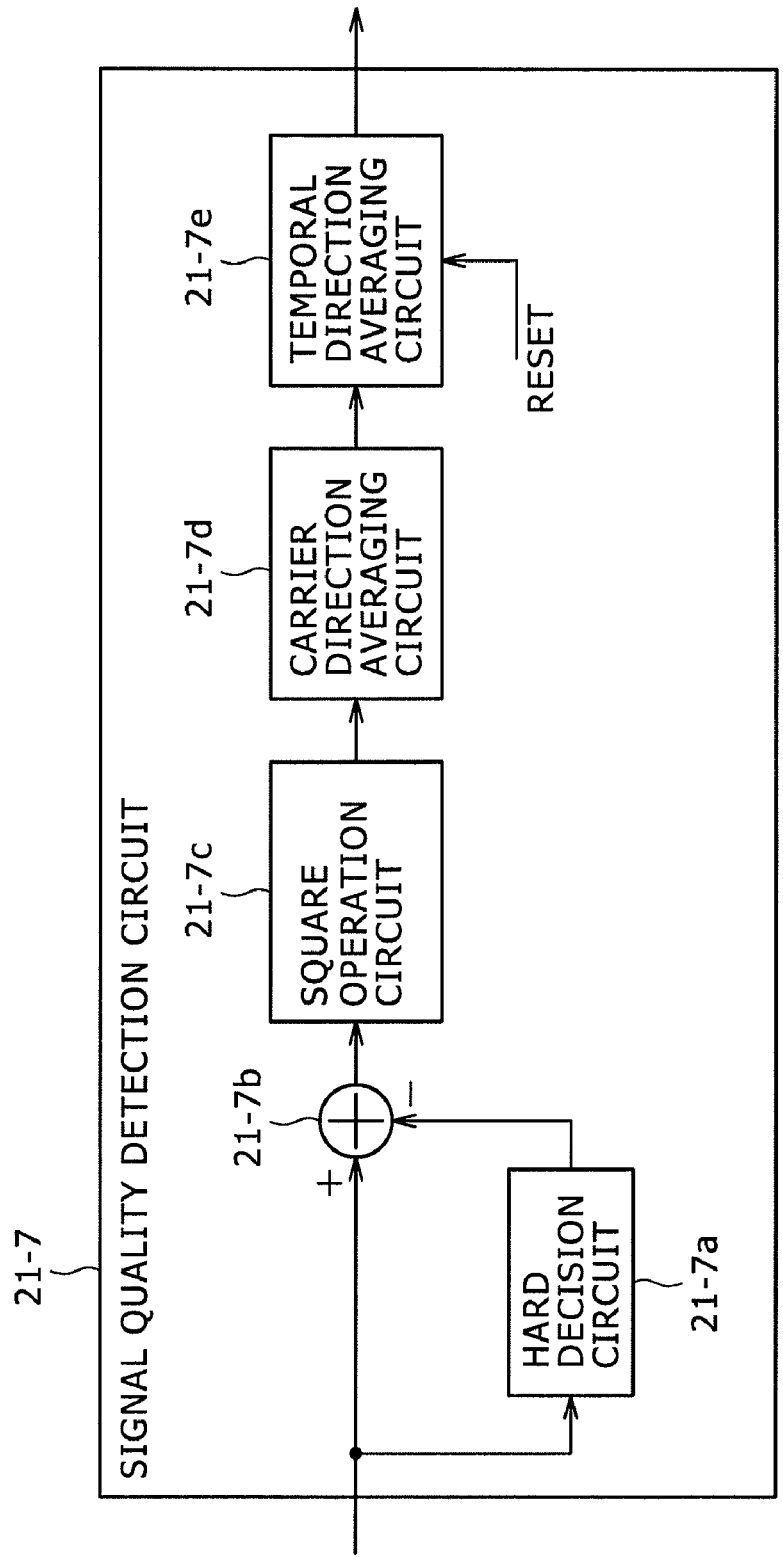
FIG. 6 is a block diagram showing an example of a configuration of a signal quality detection circuit shown in FIG. 5.

FIG. 6 is a block diagram showing an example of a configuration of the signal quality detection circuit 21-7.

Referring to FIG. 6, the signal quality detection circuit 21-7 includes a hard decision circuit 21-7a, a subtraction circuit 21-7b, a square operation circuit 21-7c, a carrier direction averaging circuit 21-7d, and a temporal direction averaging circuit 21-7e. The transmission line distortion compensated signal outputted from the division circuit 21-6 is inputted to the hard decision circuit 21-7a and the subtraction circuit 21-7b.

The hard decision circuit 21-7a performs hard decision for the transmission line distortion compensated signal in accordance with a modulation method such as the PSK or the QAM. The hard decision circuit 21-7a outputs a hard decision value as a result of the decision to the subtraction circuit 21-7b.

The subtraction circuit 21-7b outputs the difference between the hard decision value and the value of the transmission line distortion compensated signal to the square operation circuit 21-7c. The difference between the hard decision value and the OFDM frequency domain signal is determined as a noise value.

The square operation circuit 21-7c squares the noise amount calculated by the subtraction circuit 21-7b to convert the noise amount into power. The square operation circuit 21-7c outputs the power of the noise determined by the squaring operation to the carrier direction averaging circuit 21-7d.

The carrier direction averaging circuit 21-7d takes an average of the power determined by the square operation circuit 21-7c in the carrier direction to improve the accuracy. The carrier direction averaging circuit 21-7d outputs the average of the power in the carrier direction to the temporal direction averaging circuit 21-7e.

Where a single trial shift value is applied to a plurality of symbols, also it is possible to take an average in the temporal direction. In this instance, the temporal direction averaging circuit 21-7e calculates an average in the temporal direction of the power of noise included in the transmission line distortion compensated signal obtained based on the same trial shaft amount, and outputs information representative of the calculated average in the temporal direction as signal quality information to the control circuit 21-1. To the temporal direction averaging circuit 21-7e, a reset signal for erasing the information used for the calculation till then is inputted every time a trial shift amount is changed.

Here, a calculation method of an optimum shift amount offset and a delay spread estimation value is described.

Figure 7A:
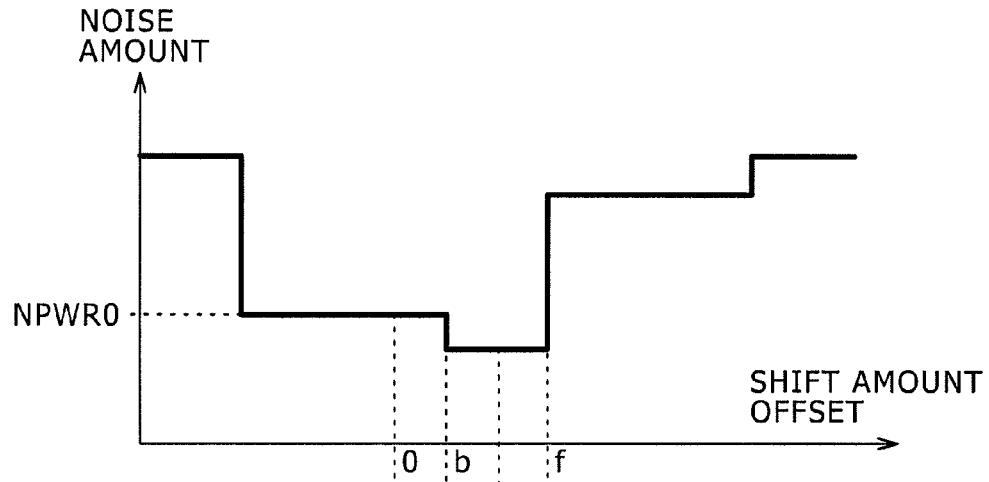
FIGS. 7A and 7B are diagrammatic views illustrating a concept of a method of calculating an optimum shift amount offset and a delay spread.
Figure 7B:
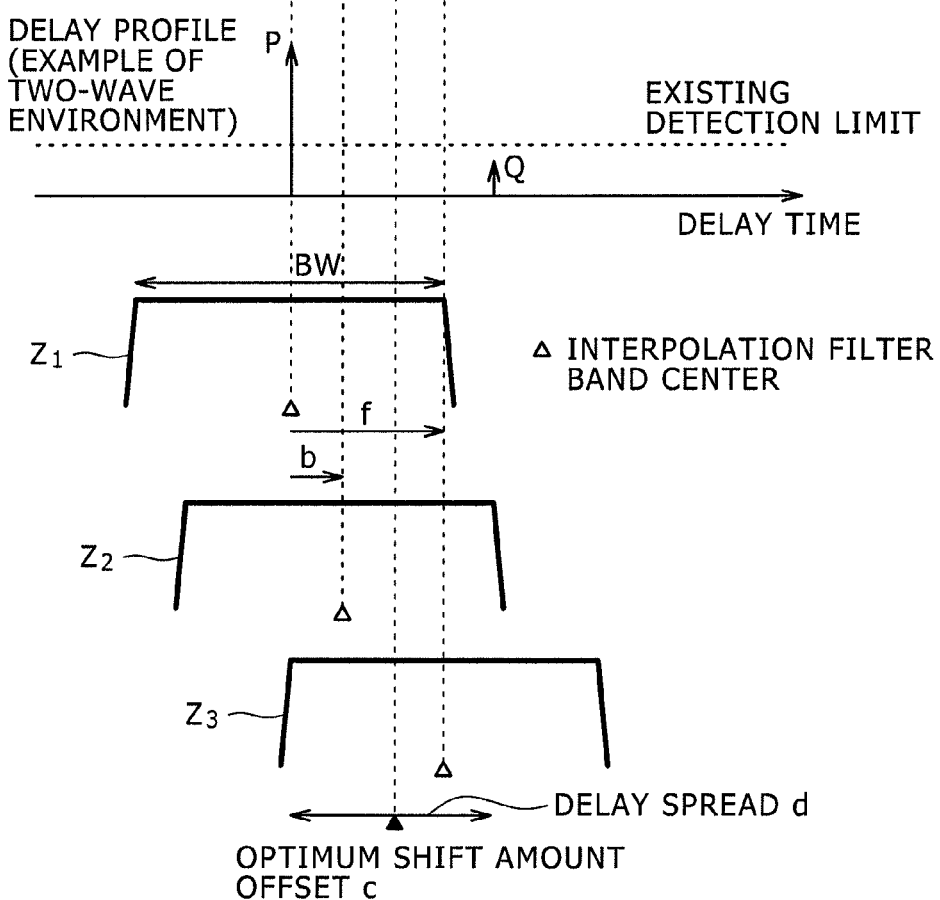

FIGS. 7A and 7B illustrate a concept of a calculation method of an optimum shift amount offset and a delay spread estimated value in a two-wave environment.

In the foregoing description, the interpolation filter of the frequency interpolation circuit 21-5 is fixed and a transmission line distortion compensated signal is produced by shifting a signal in accordance with the frequency band of the interpolation filter. However, for the convenience of illustration, the frequency band of the interpolation is shown in a shifted state in FIGS. 7A and 7B. Frequency bands $Z_1$ to $Z_3$ in FIG. 7B are represented on the time axis by shifting the frequency band of the interpolation filter of the frequency interpolation circuit 21-5. Reference character BW denotes the frequency bandwidth of the interpolation filter.

FIG. 7A indicates a variation of the noise amount represented by signal quality information with respect to the shift amount offset. The axis of abscissa indicates the shift amount offset, and the axis of ordinate indicates the noise amount. As described hereinabove, the noise amount of the transmission line distortion compensated signal is determined by the signal quality detection circuit 21-7 every time the shift amount offset is updated. If the noise amount over the overall range of the shift amount offset is illustrated at a time, then such a graph as seen in FIG. 7A is obtained.

The noise amount represented by the graph of FIG. 7A basically is the sum of the amount of noise produced by distortion of the transmission line and the amount of noise such as thermal noise applied on the transmission line. Since the latter noise cannot be removed by signal processing, where distortion of the transmission line can be compensated for correctly, the overall noise amount is proximate to zero, but where the distortion of the transmission line cannot be compensated for correctly because of presence of a path which cannot be detected or the like, the overall amount is great.

FIG. 7B illustrates a delay profile estimated in an environment in which two paths including a path P and another path Q similarly as in the delay profile illustrated in FIG. 4. From between the paths P and Q, only the path P can be detected.

In this instance, according to an existing frequency shift amount determination method, the delay spread is determined as being zero, and therefore, a shift amount with which the position of the path P comes to the center position of the frequency band of the interpolation filter is produced. Since actually the path Q which cannot be detected exists, the transmission line distortion compensated signal obtained using the shift amount determined in this manner includes noise increased by the presence of the path Q.

The shift mount offset corresponding to the center position of a delay spread which can be estimated from the delay profile is determined as a reference (0), and the noise amount at the position is represented by NPWR0. In the example of FIGS. 7A and 7B, since the delay spread which can be estimated from the delay profile is 0, the position of the path P is set as the position of the shift amount offset 0. The frequency band $Z_1$ represents a frequency band of an interpolation filter where the shift amount offset is 0, that is, where the position of the path P is the center position. The frequency band $Z_1$ does not include any component of the path Q.

As the shift amount offset outputted from the control circuit 21-1 is successively updated by a predetermined width, the frequency band of the interpolation filter is successively displaced in such a manner as seen in FIG. 7B with respect to the delay profile.

The frequency band $Z_2$ indicates the frequency band of another interpolation filter whose center position is the position b where the shift amount offset is b. The frequency band $Z_3$ indicates the frequency band of a further interpolation filter whose center position is the position f where the shift amount offset is f.

Interpolation filters whose center position is within an interval of the shift amount offset from b to f always include the path Q, and a process of removing distortion of the transmission line including a component of the path Q is performed. Accordingly, in this instance, as seen from the graph of FIG. 7A, the noise amount is reduced because the distortion of the transmission line is compensated for correctly.

Where such a noise amount as just described is detected by the signal quality detection circuit 21-7, the control circuit 21-1 uses b which is the shift amount offset at the left end of the interval within which the noise amount is minimum and f which is the shift amount offset at the right end of the interval to calculate an optimum shift amount offset c in accordance with the following expression (1):

$$c=(b+f)/2 \quad (1)$$

Further, a delay spread estimated value d is calculated in accordance with the following expression (2):

$$d=BW-(f-b) \quad (2)$$

The calculated optimum shift amount offset c is outputted from the control circuit 21-1 to the frequency shift amount production circuit 11, and the delay spread estimated value d is outputted from the control circuit 21-1 to the frequency interpolation filter selection circuit 12.

In this manner, the search circuit 21 can estimate the position of the path Q, which cannot be detected from a delay profile, based on the amount of noise, and can compensate for the distortion of the transmission line with a high degree of accuracy by performing setting of a frequency shift amount, selection of an interpolation filter and so forth in response to the estimated position of the path Q.

The search for the shift amount offsets b and f is further described.

Figure 8:
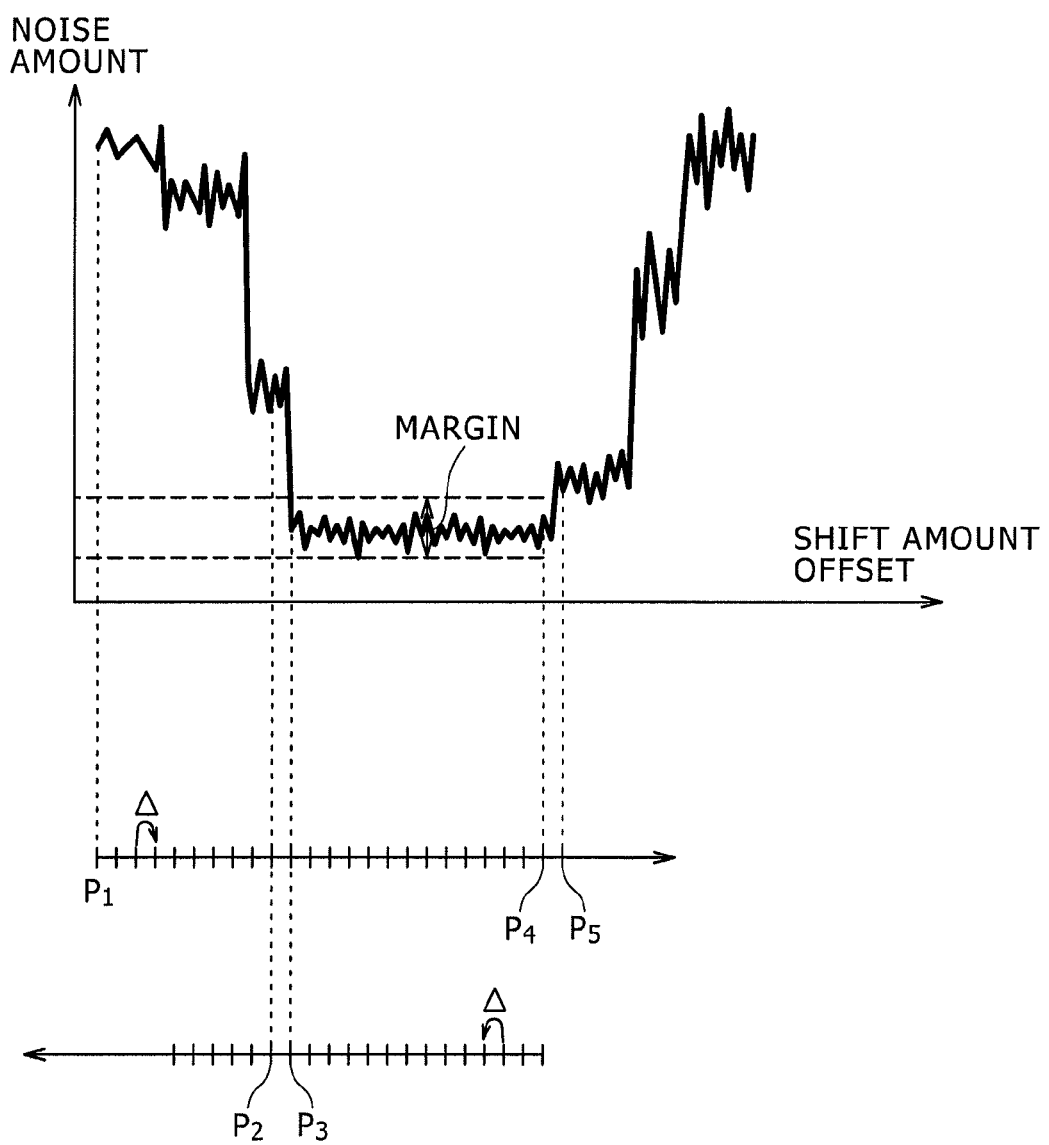
FIG. 8 is a diagrammatic view illustrating a search for the positions at the left end and the right end of an interval in which the best signal quality is provided.

Although, in the graph shown in FIG. 7A, the noise amount is indicated by linear lines, actually the noise amount is detected in a form including fluctuations as seen in FIG. 8 because of noise in the transmission line or jitters in quantization or synchronization or from transmission data. Therefore, the shift amount offsets b and f cannot be determined by simply performing priority-last and priority-first minimum value searches.

Therefore, the control circuit 21-1 successively performs a minimum value search in the plus direction and a minimum value search in the minus direction to determine the shift amount offsets f and b, respectively.

First, a process of performing a minimum value search in the plus direction to determine the shift amount offset f is described.

A position $P_1$ in FIG. 8 is a start position set in order to perform a search for the shift amount offset f. The shift amount offset is updated in the plus direction step by step by a predetermined step width $\Delta$ with reference to the position $P_1$. This can be represented by the following description (3):

$$f[n+1]=f[n]+\Delta \quad (3)$$

where f[n] is the shift amount offset at present, and f[n+1] is the shift amount offset after the shift amount offset at present is updated only once. The step width $\Delta$ may be varied in response to time and may not necessarily be fixed within one search.

The noise amount npwr[n] at the shift amount offset f[n] at present is acquired, and the shift amount offset is updated until after the noise amount npwr[n] satisfies a condition given by the following expression (4). In this instance, a predetermined noise amount is set as a margin.

$$n\text{pwr}[n]>\min\{n\text{pwr}[0], n\text{pwr}[1], n\text{pwr}[2], \ldots, n\text{pwr}[n-1]\}+\text{margin} \quad (4)$$

When the condition of the expression (4) is satisfied, another shift amount offset f[n−1] which immediately precedes to the shift amount offset f[n] at present is determined as the shift amount offset f.

In FIG. 8, since the shift amount offset at a position $P_5$ satisfies the condition of the expression (4), the shift amount offset at a position $P_4$ is set as the shift amount offset f.

Now, a process of performing a minimum value search in the minus direction to determine a shift amount offset b is described.

The start position for the search for the shift amount offset b is the position $P_4$ determined as the shift amount offset f. The value of the shift amount offset b is updated in the minus direction successively step by step by the predetermined step width $\Delta$ with reference to the position $P_4$. This can be represented by the following expression (5):

$$b[n+1]=b[n]-\Delta \quad (5)$$

where b[n] is the shift amount offset at present, and b[n+1] is the shift amount offset after the shift amount offset at present is updated by only once.

Similarly as in the search for the shift amount offset f, the noise amount npwr[n] at the shift amount offset b[n] at present is acquired, and the shift amount offset is updated until after a condition of the expression (6) given below becomes satisfied:

$$n\text{pwr}[n]>\min\{n\text{pwr}[0], n\text{pwr}[1], n\text{pwr}[2], \ldots, n\text{pwr}[n-1]\}+\text{margin} \quad (6)$$

If the condition of the expression (6) is satisfied, then the shift amount offset b[n−1] which immediately precedes to the shift amount offset b[n] at present is set as the shift amount offset b.

In FIG. 8, the condition of the expression (6) is satisfied by the shift amount offset at a position $P_2$, the shift amount offset at a position $P_3$ is determined as the shift amount offset b.

The shift amount offsets b and f determined in such a manner as described above are used for calculation of the optimum shift amount offset c in accordance with the expression (1) and for calculation of the delay spread estimated value d in accordance with the expression (2).

It is to be noted that, to the margins included in the expressions (4) and (6), different values may be set in response to the noise amount. Usually, where the absolute value of the noise amount is high, also the dispersion is great, but where the absolute value of the noise amount is low, also the dispersion is small.

If the margins are set variable taking the foregoing into consideration, then it is possible to determine optimum values of the shift amount offsets b and f in a fixed accuracy irrespective of the magnitude of the absolute value of the noise amount. In particular, at a position at which the absolute value of the noise amount is high, a high value is set as the margin, but at another position at which the absolute value of the noise amount is low, a low value is set as the margin.

Now, processes of the OFDM receiver 101 which has such a configuration as described above are described. The processes described below are suitably executed in parallel to or before or after other processes.

First, an OFDM demodulation process of the OFDM receiver 101 is described with reference to flow charts of FIGS. 9 and 10.

Figure 9:
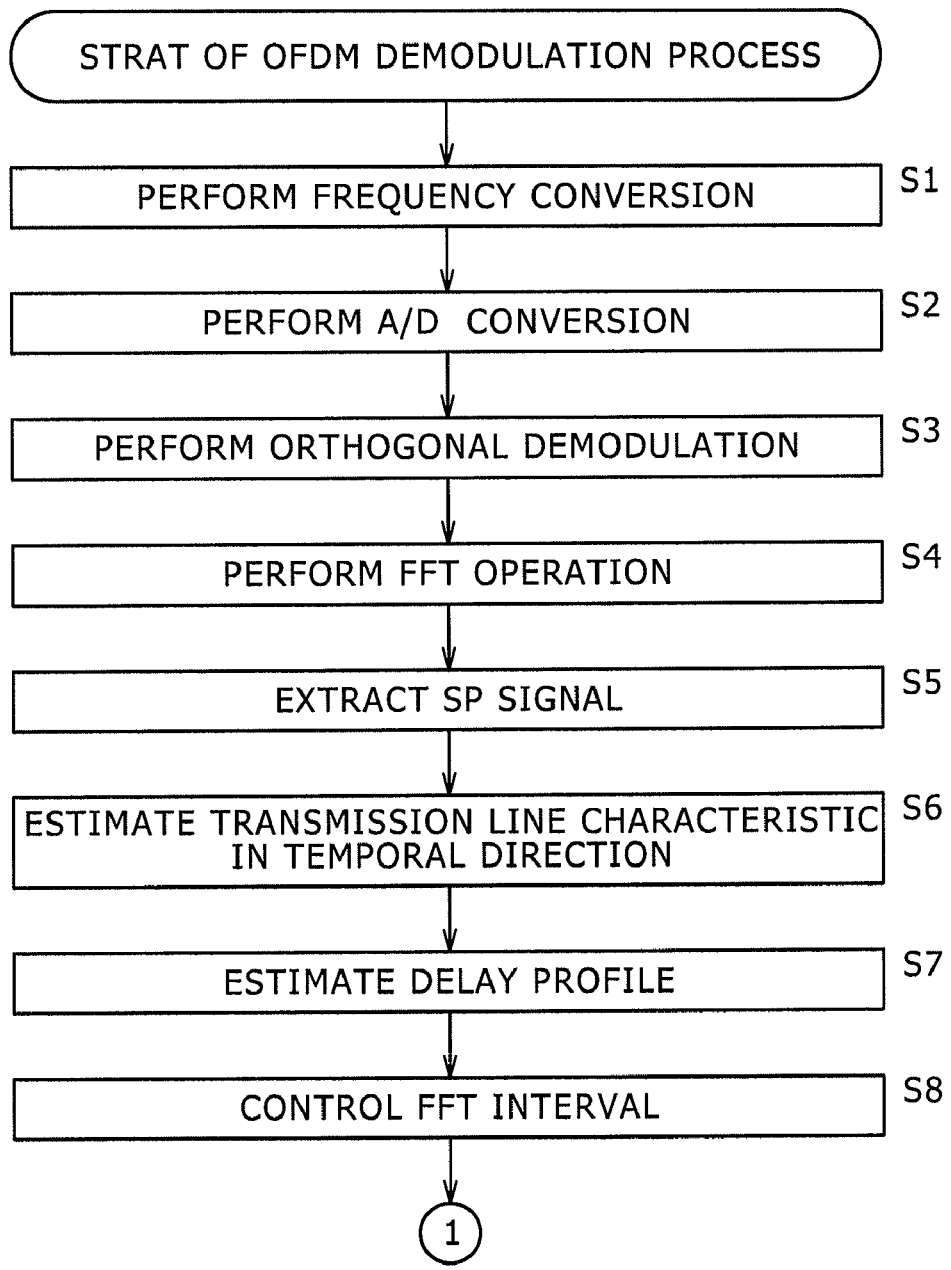
FIGS. 9 and 10 are flow charts illustrating an OFDM demodulation process by the OFDM receiver of FIG. 5.

Referring first to FIG. 9, first at step S1, the tuner 2 frequency converts an RF signal received by the reception antenna 1 and outputs a resulting IF signal to the A/D conversion circuit 3.

At step S2, the A/D conversion circuit 3 performs A/D conversion for the IF signal and outputs a resulting digital IF signal to the orthogonal demodulation circuit 4.

At step S3, the orthogonal demodulation circuit 4 performs orthogonal demodulation and outputs a resulting time domain OFMD signal to the carrier production circuit 5, FFT circuit 6, FFT interval control circuit 7 and delay profile estimation circuit 10.

At step S4, the FFT circuit 6 sets an FFT interval in response to an FFT trigger pulse supplied thereto from the FFT interval control circuit 7 and performs an FFT operation. The FFT circuit 6 outputs an OFDM frequency domain signal obtained by the FFT operation to the reception signal frequency shift circuit 8-1, SP extraction circuit 8-2 and reception signal frequency shift circuit 21-3.

At step S5, the SP extraction circuit 8-2 extracts an SP signal from the frequency domain OFDM signal and estimates transmission line characteristics of subcarriers at the arrangement positions of the SP signal. The SP extraction circuit 8-2 outputs a signal representative of the estimated transmission line characteristics to the temporal direction transmission line characteristic estimation circuit 8-3.

At step S6, the temporal direction transmission line characteristic estimation circuit 8-3 estimates a transmission line characteristic in the temporal direction for every three subcarriers and outputs the estimated transmission line characteristics to the transmission line characteristic frequency shift circuit 8-4, delay profile estimation circuit 10 and transmission line characteristic frequency shift circuit 21-4.

At step S7, the delay profile estimation circuit 10 estimates a delay profile and outputs the delay profile to the FFT interval control circuit 7, frequency shift amount production circuit 11 and frequency interpolation filter selection circuit 12.

At step S8, the FFT interval control circuit 7 determines an FFT interval based on the time domain OFDM signal supplied thereto from the orthogonal demodulation circuit 4 and the delay profile estimated by the delay profile estimation circuit 10, and outputs an FFT trigger pulse which designates the determined FFT interval to the FFT circuit 6.

Figure 10:
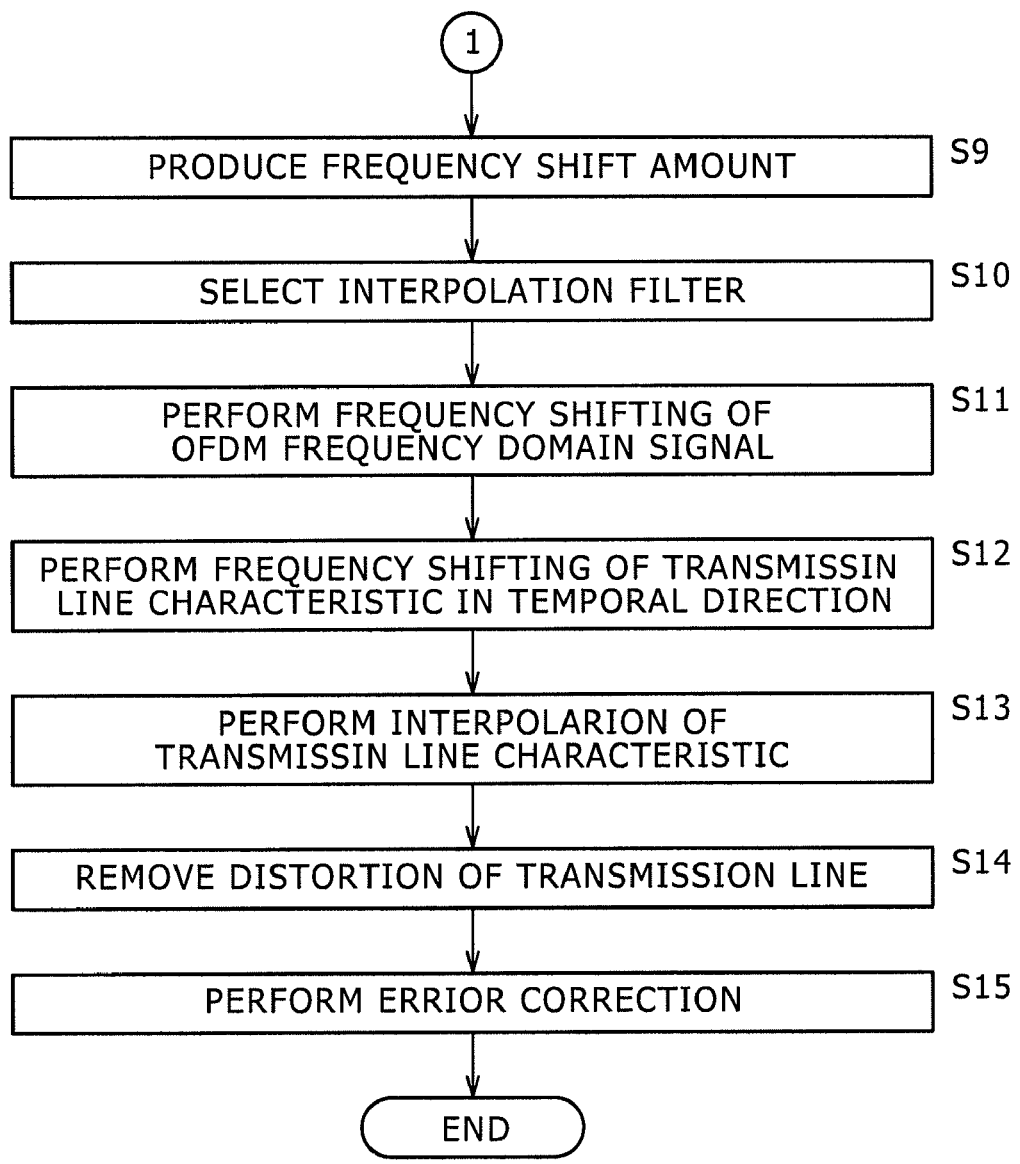
Figure 11:
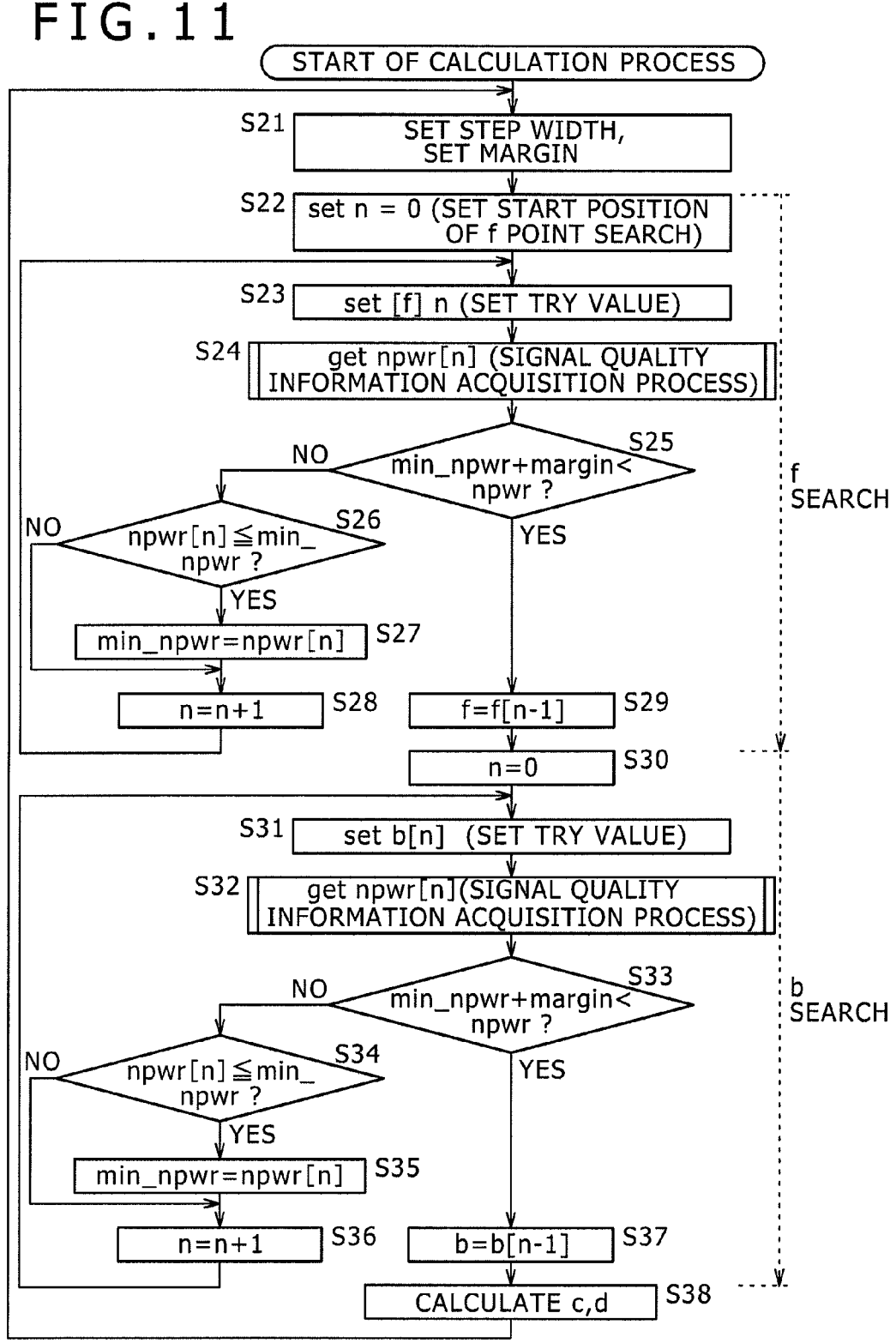
FIG. 11 is a flow chart illustrating a calculation process by the OFDM receiver of FIG. 5.

Referring now to FIG. 10, at step S9, the frequency shift amount production circuit 11 produces a shift amount based on the delay profile and an optimum shift amount offset supplied from the control circuit 21-1 of the search circuit 21, and outputs a signal representative of the produced shift amount to the reception signal frequency shift circuit 8-1, transmission line characteristic frequency shift circuit 8-4 and addition circuit 21-2. To the frequency shift amount production circuit 11, an optimum shift amount offset calculated by the execution of the process illustrated in FIG. 11 is supplied from the control circuit 21-1.

At step S10, the frequency interpolation filter selection circuit 12 selects an interpolation filter based on the delay profile and a delay spread estimated value supplied thereto from the control circuit 21-1, and outputs a filter selection signal to the frequency interpolation circuit 8-5. To the frequency interpolation filter selection circuit 12, a delay spread estimated value calculated by the execution of the process illustrated in FIG. 11 is supplied from the control circuit 21-1.

At step S11, the reception signal frequency shift circuit 8-1 performs frequency shifting of the OFDM frequency domain signal supplied thereto from the FFT circuit 6 and outputs a resulting OFDM frequency domain signal to the division circuit 8-6.

At step S12, the transmission line characteristic frequency shift circuit 8-4 performs frequency shifting of the transmission line characteristic for every 3 subcarriers estimated by the temporal direction transmission line characteristic estimation circuit 8-3 and outputs a resulting transmission line characteristic to the frequency interpolation circuit 8-5.

At step S13, the frequency interpolation circuit 8-5 uses the interpolation filter selected by the frequency interpolation filter selection circuit 12 to perform a frequency interpolation process to estimate the transmission line characteristic of the subcarrier at the position of each OFDM symbol in the frequency direction. The frequency interpolation circuit 8-5 outputs a signal representative of the transmission line characteristics of all subcarriers at the positions of the OFDM symbols to the division circuit 8-6.

At step S14, the division circuit 8-6 removes components of distortion by the transmission line from the OFDM frequency domain signal supplied thereto from the reception signal frequency shift circuit 8-1. The division circuit 8-6 outputs the frequency domain OFDM signal from which the distortion components are removed to the error correction circuit 9.

At step S15, the error correction circuit 9 performs various processes such as deinterleave, depuncture, Viterbi decoding, diffused signal removal and RS decoding for the frequency domain OFDM signal and outputs resulting decoded data to a circuit on the succeeding stage.

The processes described above are repeated by the OFDM receiver 101 while signal reception continues.

Now, a process by the control circuit 21-1 of calculating an optimum shift amount offset and a delay spread estimated value is described with reference to a flow chart of FIG. 11.

In the OFDM receiver 101, the processes of FIG. 11 are normally performed in parallel to the processes of FIGS. 9 and 10 while signal reception continues.

A process for searching for a shift amount offset f is performed at steps S22 to S29 of FIG. 11, and a process for searching for a shift amount offset b is performed at steps S30 to S37 of FIG. 11. After the shift amount offsets f and b are determined, an optimum shift amount offset and a delay spread estimated value are calculated.

At step S21, the control circuit 21-1 sets a step width Δ and a margin for the shift amount offset.

At step S22, the control circuit 21-1 sets a start position for searching for a shift amount offset f.

At step S23, the control circuit 21-1 sets the shift amount offset at present as a try value f[n].

At step S24, the control circuit 21-1 performs a signal quality information acquisition process. By the process, the noise amount npwr[n] at the try value f[n] is acquired. The signal quality information acquisition process is hereinafter described with reference to a flow chart of FIG. 12.

At step S25, the control circuit 21-1 decides whether or not the value of the sum of a minimum value from among the noise amounts npwr[0], npwr[1], npwr[2], . . . , npwr[n−1] acquired till now and the margin is lower than the noise amount npwr[n], that is, whether or not the condition of the expression (4) given hereinabove is satisfied.

If it is decided at step S25 that the condition of the expression (4) is not satisfied, then the control circuit 21-1 decides at step S26 whether or not the noise amount npwr[n] is equal to or lower than the minimum value of the noise amounts npwr[0], npwr[1], npwr[2], . . . , npwr[n−1].

If it is decided at step S26 that the noise amount npwr[n] is equal to or lower than the minimum value of the noise amounts npwr[0], npwr[1], npwr[2], . . . , npwr[n−1], then the control circuit 21-1 sets the noise amount npwr[n] as a new minimum value at step S27.

On the other hand, if it is decided at step S26 that the noise amount npwr[n] is not equal to or lower than the minimum value of the noise amounts npwr[0], npwr[1], npwr[2], . . . , npwr[n−1], then the process at step S27 is skipped.

At step S28, the control circuit 21-1 increments the value of the parameter n by one. Thereafter, the processes at the steps beginning with step S23 are repeated.

On the other hand, if it is decided at step S25 that the condition of the expression (4) is satisfied, then the control circuit 21-1 decides the immediately preceding try value f[n−1] as the shift amount offset f at step S29.

At step S30, the control circuit 21-1 resets the value of the parameter n.

At step S31, the control circuit 21-1 sets the position determined as the shift amount offset f as a start position for a search for the shift amount offset b and sets the try value b[n].

At step S32, the control circuit 21-1 performs a signal quality information acquisition process. By this process, the noise amount npwr[n] at the try value b[n] is acquired.

At step S33, the control circuit 21-1 decides whether or not the value of the sum of the minimum value from among the noise amounts npwr[0], npwr[1], npwr[2], . . . , npwr[n−1] acquired till now and the margin is lower than the noise amount npwr[n], that is, whether or not the condition of the expression (6) given hereinabove is satisfied.

If it is decided at step S33 that the condition of the expression (6) is not satisfied, then the control circuit 21-1 decides at step S34 whether or not the noise amount npwr[n] is equal to or lower than the minimum value of the noise amounts npwr[0], npwr[1], npwr[2], . . . , npwr[n−1].

If it is decided at step S34 that the noise amount npwr[n] is equal to or lower than the minimum value of the noise amounts npwr[0], npwr[1], npwr[2], . . . , npwr[n−1], then the control circuit 21-1 sets the noise amount npwr[n] as a new minimum value at step S35.

On the other hand, if it is decided at step S34 that the noise amount npwr[n] is not equal to or lower than the minimum value of the noise amounts npwr[0], npwr[1], npwr[2], . . . , npwr[n−1], then the process at step S35 is skipped.

At step S36, the control circuit 21-1 increments the value of the parameter n by one. Thereafter, the processes at the steps beginning with step S31 are repeated.

On the other hand, if it is decided at step S33 that the condition of the expression (6) is satisfied, then the control circuit 21-1 decides the immediately preceding try value b[n−1] as the shift amount offset b.

At step S38, the control circuit 21-1 uses the shift amount offsets b and f to perform calculation of the expression (1) to calculate the optimum shift amount offset c and performs calculation of the expression (2) to calculate the delay spread estimated value d. The control circuit 21-1 outputs the optimum shift amount offset c to the frequency shift amount production circuit 11 and outputs the delay spread estimated value d to the frequency interpolation filter selection circuit 12.

Thereafter, the processing returns to step S21 so that the processes described above are repeated.

Figure 12:
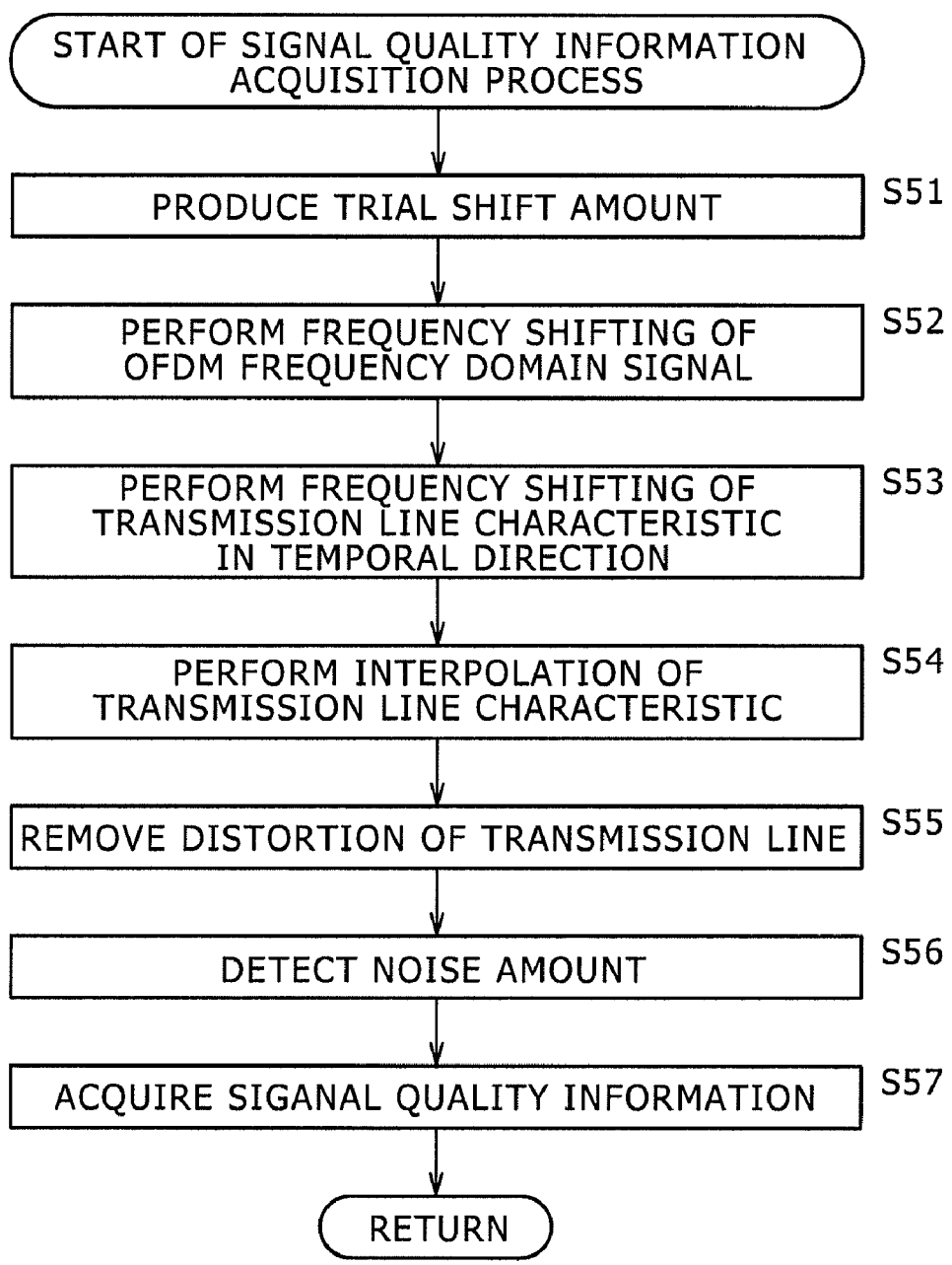
FIG. 12 is a flow chart illustrating a signal quality information acquisition process performed in the calculation process of FIG. 11.

Now, the signal quality information acquisition process performed at step S24 or S32 of FIG. 11 is described with reference to a flow chart of FIG. 12.

At step S51, the addition circuit 21-2 adds the shift amount offset supplied thereto from the control circuit 21-1, that is, the try value set at step S23 or S31 of FIG. 11, to the shift amount produced by the frequency shift amount production circuit 11 to produce a trial shift amount. The addition circuit 21-2 outputs the trial shift amount to the reception signal frequency shift circuit 21-3 and the transmission line characteristic frequency shift circuit 21-4.

At step S52, the reception signal frequency shift circuit 21-3 performs frequency shifting of the OFDM frequency domain signal supplied thereto from the FFT circuit 6 in accordance with the trial shift amount. Then, the reception signal frequency shift circuit 21-3 outputs an OFDM frequency domain signal obtained by the frequency shifting to the division circuit 21-6.

At step S53, the transmission line characteristic frequency shift circuit 21-4 performs frequency shifting of the transmission line characteristic estimated by the temporal direction transmission line characteristic estimation circuit 8-3 in accordance with the trial shift amount. Then, the transmission line characteristic frequency shift circuit 21-4 outputs the transmission line characteristic obtained by the frequency shifting to the division circuit 21-6.

At step S54, the frequency interpolation circuit 21-5 performs a frequency interpolation process to estimate a transmission line characteristic of all subcarriers at the position of each OFDM symbol. The frequency interpolation circuit 21-5 outputs a signal representative of the estimated transmission line characteristics of all of the subcarriers.

At step S55, the division circuit 21-6 removes components of distortion by the transmission line included in the OFDM frequency domain signal supplied from the reception signal frequency shift circuit 21-3 and outputs a resulting transmission line distortion compensated signal to the signal quality detection circuit 21-7.

At step S56, the signal quality detection circuit 21-7 detects a noise amount of the frequency domain OFDM signal supplied from the division circuit 21-6 and outputs signal quality information representative of the detected noise amount to the control circuit 21-1.

At step S57, the control circuit 21-1 acquires the signal quality information supplied from the signal quality detection circuit 21-7.

Thereafter, the processing returns to step S24 or step S32 of FIG. 11 to perform the processes at the steps beginning with step S24 or S32.

By the processes described above, it becomes possible to compensate also for distortion by a path which cannot be estimated from a delay profile. In other words, distortion of the transmission line can be compensated for with a high degree of accuracy.

Further, where the processes described above are normally performed, also in such an environment in which the delay file fluctuates successively, it is possible to compensate for the distortion of the transmission line following up the fluctuation.

Further, since the search circuit 21 provided in parallel to the transmission line distortion compensation circuit 8 which performs compensation for distortion of the transmission line estimates the transmission line characteristic, and a result of the estimation is reflected on a signal which is an object of processing of the transmission line distortion compensation circuit 8, failure in data does not occur at all.

Figure 13:
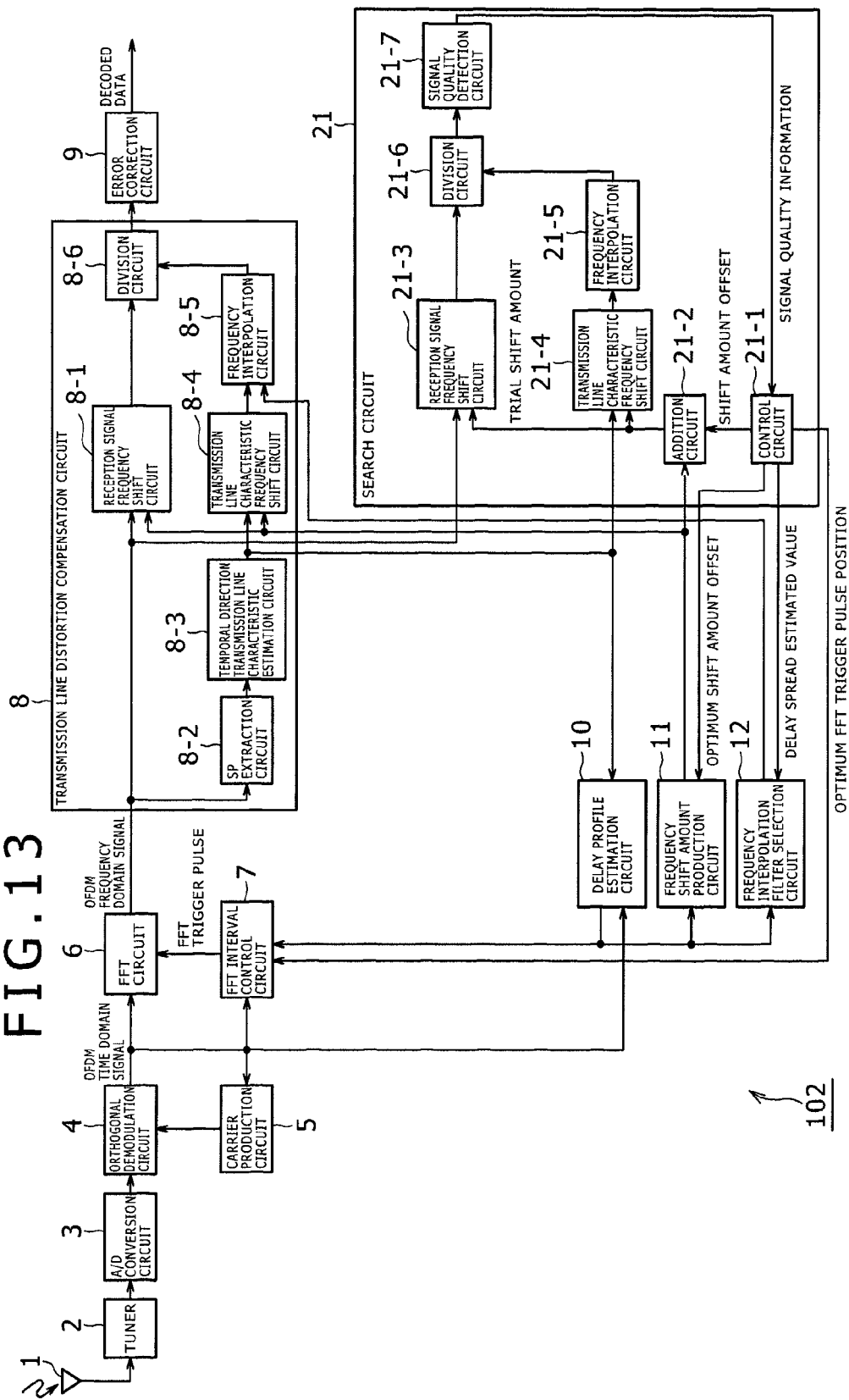
FIG. 13 is a block diagram showing an example of a configuration of a modified form of the OFDM receiver of FIG. 5.

FIG. 13 shows an example of a configuration of a modified form of the OFDM receiver to which the present invention is applied. The like configurations to those of the OFDM receiver 101 in FIG. 5 are denoted by the same symbols.

Referring to FIG. 13, the OFDM receiver 102 shown is similar in configuration to the OFDM receiver 101 of FIG. 5 except that the position of an optimum FFT trigger pulse is calculated based on transmission line quality information by the control circuit 21-1 and is supplied to the FFT interval control circuit 7. The optimum FFT trigger pulse position is used to set an optimum start position of an FFT interval.

From the FFT interval control circuit 7 which acquires the optimum FFT trigger pulse position, the optimum FFT trigger pulse position and an FFT trigger pulse which represents a start position of an FFT interval determined based on a delay profile estimated by the delay profile estimation circuit 10 are outputted to the FFT circuit 6. Where the optimum FFT trigger pulse position represents the position of the earliest incoming wave, an FFT trigger pulse which defines the position as a start position of an FFT interval is outputted.

Here, a method of calculating the optimum FFT trigger pulse position is described.

Figure 14A:
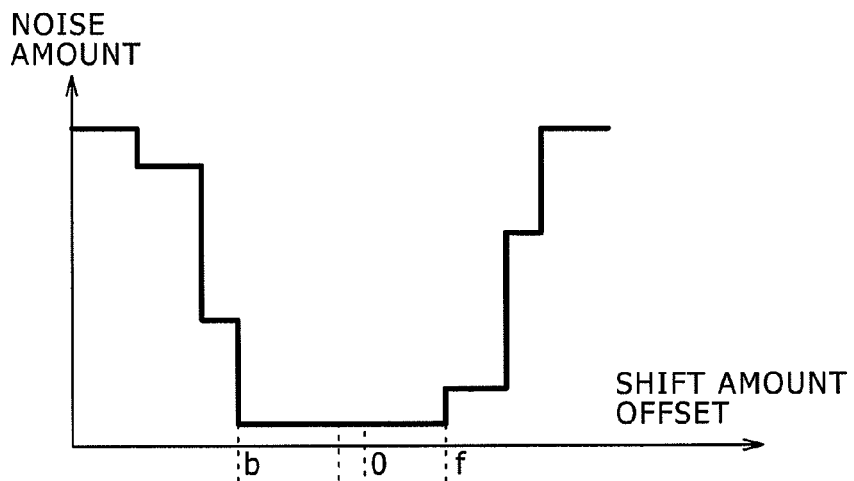
FIGS. 14A and 14B are diagrammatic views illustrating a method of calculating an optimum trigger pulse position.
Figure 14B:
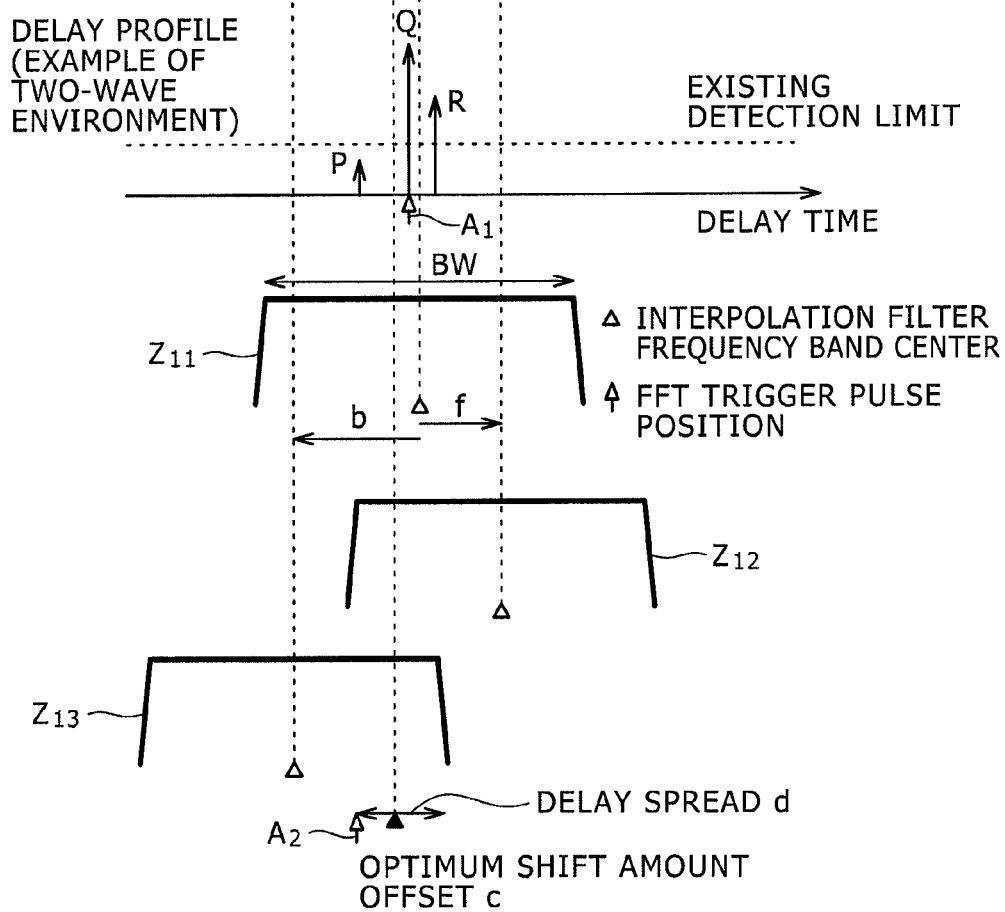

FIGS. 14A and 14B illustrate a concept of the calculation method of the optimum FFT trigger pulse position in a three-wave environment.

Referring to FIG. 14B, frequency bands $Z_{11}$ to $Z_{13}$ represent those of the interpolation filters of the frequency interpolation circuit 21-5 shifted on the time axis. Reference character BW represents the frequency bandwidth of the interpolation filters.

FIG. 14A illustrates a variation of the noise amount represented by signal quality information with respect to the shift amount offset. The axis of abscissa indicates the shift amount offset, and the axis of ordinate indicates the noise amount.

FIG. 14B illustrates a delay profile estimated in an environment wherein three paths including a path P, another path Q and a path R exist. The path Q and the path R can be detected from the delay profile, and the path P which is the earliest incoming wave cannot be detected.

In this instance, according to an existing frequency shift amount determination method, a delay spread only corresponding to the distance between the path Q and the path R is detected, and therefore, a shift amount with which the center position of the path Q and the path R comes to the center position of the frequency band of an interpolation filter is produced. The frequency band $Z_{11}$ of FIG. 14B represents that of an interpolation filter whose center position coincides with the center position of the path Q and the path R.

Further, according to an existing FFT trigger pulse production method, the FFT trigger pulse is produced in accordance with the position of the path Q which is the earliest incoming wave which can be detected as indicated by an arrow mark $A_1$ of FIG. 14B.

The control circuit 21-1 shown in FIG. 13 determines the shift amount offsets f and b similarly to the control circuit 21-1 of FIG. 5.

The frequency band $Z_{12}$ shown in FIG. 14B represents, where the shift amount offset is f, the frequency band of the interpolation filter whose center position coincides with the position of the shift amount offset f. The frequency band $Z_{13}$ represents, where the shift amount offset is b, the frequency band of an interpolation filter whose center position coincides with the position of the shift amount offset b.

Since the shift amount offsets f and b represent the positions at the opposite ends of an interval within which the noise amount is smallest, also the path P is always included in the frequency band of the interpolation filter whose center position coincides with a position within the interval wherein the shift amount offset ranges from b to f.

After at least the shift amount offset f from between the shift amount offsets f and b is determined, the control circuit 21-1 calculates an optimum FFT trigger pulse position t in accordance with the following expression (7).

$$t = f - BW/2 \quad (7)$$

The optimum FFT trigger pulse position t has a meaning of the position of an optimum FFT trigger pulse represented with reference to the center position of the path Q and the path R which can be detected from the delay profile.

In particular, the interval of the shift amount offset in which the noise value is minimum is detected with reference to the center position of the delay spread which can be detected from the delay profile, and the position of the path P which is the actual earliest incoming wave is estimated based on the shift amount offset f which is maximum in the detected interval and the bandwidth BW of the interpolation filter. Then, when the delay spread estimated value d calculated in accordance with the expression (2) is lower than the GI length, the optimum FFT trigger pulse position t is set so that the estimated position may be the start position of the FFT interval. In FIGS. 14A and 14B, the position indicated by an arrow mark $A_2$ is same as the position of the path P, and the position indicated by this arrow mark $A_2$ is calculated as the optimum FFT trigger pulse position t.

The optimum FFT trigger pulse position t calculated in this manner is outputted from the control circuit 21-1 to the FFT interval control circuit 7. The FFT interval control circuit 7 thus determines the start position of the FFT period based on the optimum FFT trigger pulse position t and the delay profile estimated by the delay profile estimation circuit 10.

Here, a process of the OFDM receiver 102 of FIG. 13 is described.

The processes of the OFDM receiver 102 are basically similar to those of the OFDM receiver 101 except that calculation of an optimum FFT trigger pulse position is performed and that the determination of an FFT interval is performed taking the optimum FFT trigger pulse position into consideration.

In particular, processes similar to those described hereinabove with reference to FIGS. 9 and 10 are performed by the OFDM receiver 102. However, at step S8 of FIG. 9, an optimum FFT trigger pulse position is taken into consideration in order to control the FFT interval.

The process by the control circuit 21-1 of calculating the optimum FFT trigger pulse position in addition to the optimum shift amount offset and the delay spread estimated value are described with reference to a flow chart of FIG. 15.

At steps S71 to S88 of FIG. 15, processes similar to those at steps S21 to S38 of FIG. 11 are executed, respectively. In particular, a search for a shift amount offset f is performed at steps S72 to S79, and a search for a shift amount offset b is performed at steps S80 to S87. After the shift amount offsets f and b are determined, an optimum shift amount offset c and a delay spread estimated value d are calculated at step S88.

At step S89, the control circuit 21-1 performs calculation of the expression (7) given hereinabove using the shift amount offset f and the bandwidth BW to calculate the optimum FFT trigger pulse position t. The control circuit 21-1 outputs the optimum FFT trigger pulse position t to the FFT interval control circuit 7.

Thereafter, the processing returns to step S71 to repeat the processes described above.

By the processes described above, the position of the earliest incoming wave which cannot be detected from a delay profile can be estimated, and an FFT interval can be set taking the estimated position into consideration. Consequently, deterioration of a signal by interference between symbols can be suppressed.

While, in the foregoing description, the noise amount is detected by performing a hard decision, a noise component of a transmission line distortion compensated signal or a BER (Bit Error Rate) which can be calculated from an error correction number may be produced as signal quality information.

While the series of processes described above can be executed by hardware, it may otherwise be executed by software. Where the series of processes is executed by software, a program which configures the software is installed from a program recording medium into a computer incorporated in hardware for exclusive use or, for example, a personal computer for universal use which can execute various functions by installing various programs.

Figure 16:
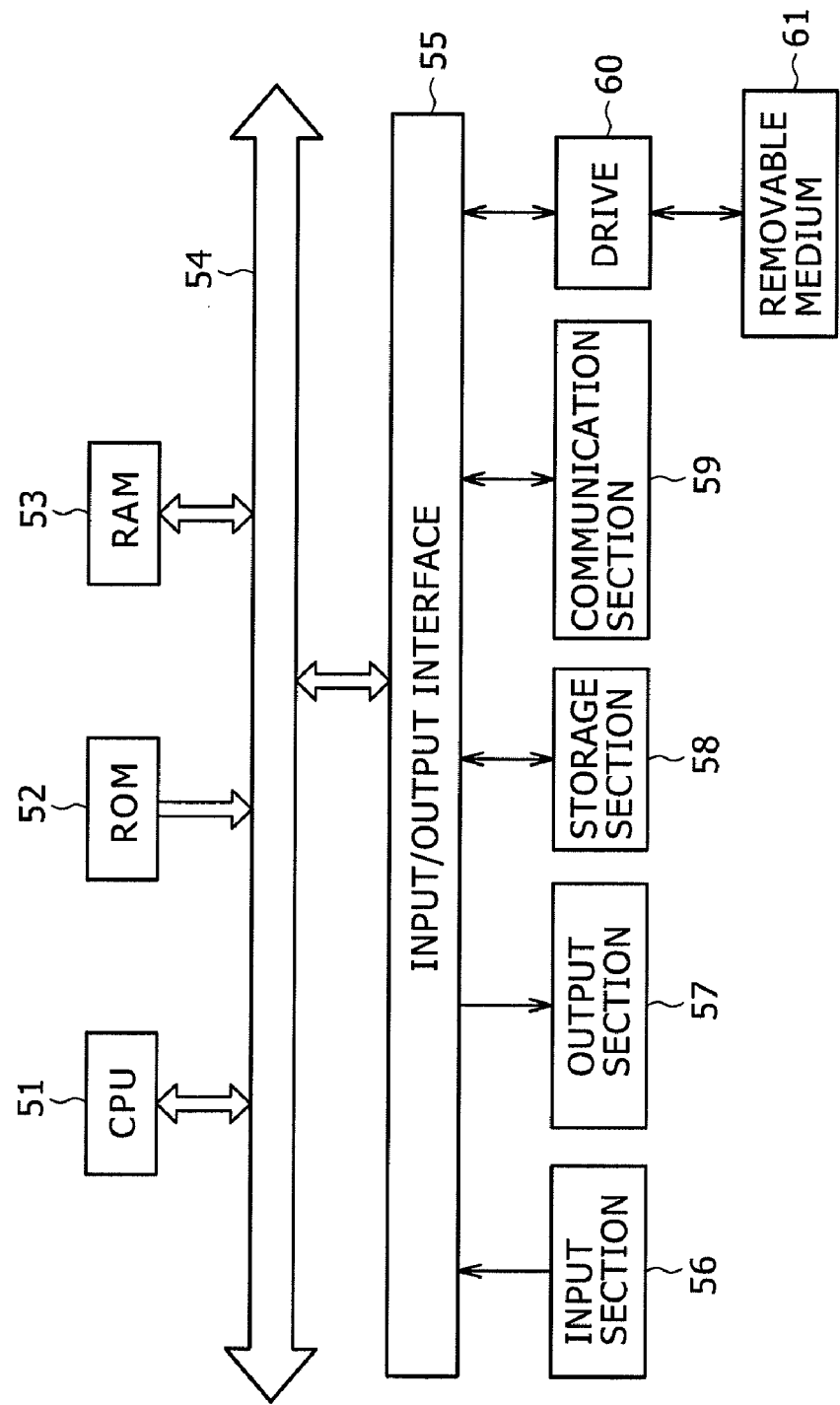
FIG. 16 is a block diagram showing an example of a configuration of a personal computer.

FIG. 16 shows an example of a hardware configuration of a computer which executes the series of processes described hereinabove in accordance with a program.

A CPU (Central Processing Unit) 51, a ROM (Read Only Memory) 52 and a RAM (Random Access Memory) 53 are connected to each other by a bus 54.

Further, an input/output interface 55 is connected to the bus 54. An input section 56 including a keyboard, a mouse, a microphone and so forth, an output section 57 including a display unit, a speaker and so forth, a storage section 58 formed from a hard disk, a nonvolatile memory or the like, a communication section 59 including a network interface and so forth, and a drive 60 for driving a removable medium 61 such as an optical disk or a semiconductor memory are connected to the input/output interface 55.

In the computer configured in such a manner as described above, the CPU 51 loads a program stored, for example, in the storage section 58 into the RAM 53 through the input/output interface 55 and the bus 54 and then executes the program to perform the series of processes described above.

The program to be executed by the CPU 51 is, for example, recorded in and provided together with the removable medium 61 or provided through a wired or wireless transmission medium such as a local area network, the Internet or digital broadcasting, and is installed into the storage section 58.

It is to be noted that the program to be executed by the computer may be of a type wherein processes are executed in a time series in the order as described in the present specification or of another type wherein processes are executed in parallel or executed at a necessary timing such as when it is called.

While preferred embodiments of the present invention have been described using specific terms, such description is for illustrative purposes only, and it is to be understood that changes and variations may be made without departing from the spirit or scope of the following claims.

What is claimed is:

1. A reception apparatus comprising:
   extraction means for extracting a pilot signal from a frequency domain orthogonal frequency division multiplexing signal:
   transmission line characteristic estimation means for estimating a transmission line characteristic in a temporal direction based on the pilot signal extracted by said extraction means and producing a transmission line characteristic signal representative of the estimated transmission line characteristic;
   estimation means for estimating a delay profile from the transmission line characteristic signal produced by said transmission line characteristic estimation means;
   frequency shift amount production means for producing a frequency shift amount based on the delay profile estimated by said estimation means and a frequency band of an interpolation filter to be used in a frequency interpolation process:
   control means for producing a shift amount offset representing a predetermined shift amount;
   addition means for adding the frequency shift amount produced by said frequency shill amount production means and the shift amount offset produced by said control means to produce a trial shift amount;
   first frequency shifting means for performing frequency shifting of the frequency domain orthogonal frequency division multiplexing signal in accordance with the trial shift amount produced by said addition means;
   second frequency shifting means for performing frequency shifting of the transmission line characteristic signal in accordance with the trial shift amount produced by said addition means;
   interpolation means for performing a frequency interpolation process for the transmission line characteristic signal frequency-shifted by said second frequency shifting means using said interpolation filter to produce a signal representative of the transmission line characteristics of all subcarriers:
   compensation means for producing based on the frequency domain orthogonal frequency division multiplexing signal frequency-shifted by said first frequency shifting means and the signal produced by the frequency interpolation process of said interpolation means, a transmission line distortion compensated signal in the form of a signal from which components of distortion of a transmission line are removed:
   detection means for detecting a noise amount included in the transmission line distortion compensated signal produced by said compensation means; and
   operation means for performing a fast fourier transform operation for a time domain orthogonal frequency division multiplexing signal to produce the frequency domain orthogonal frequency division multiplexing signal;

said control means being operable, when the position of the earliest incoming wave on the time axis cannot be detected from the delay profile estimated by said estimation means, to detect an interval of the shift amount offset within which the noise amount detected by said detection means is minimum, detect a shift amount offset which exhibits a maximum value within the interval with reference to a center position of the delay spread which can be detected based on the delay profile and estimate the position of the earliest incoming wave on the time axis from the detected maximum shift amount offset and the frequency band of the interpolation filter used by said interpolation means to set a start position of the fast fourier transform operation by said operation means.

2. The reception apparatus according to claim 1, wherein said control means sets, as the start position of the fast fourier transform operation, the position on the time axis corresponding to a value obtained by an expression f−BW/2 where f is the detected maximum shift amount offset and BW is the width when the frequency band of the interpolation filter used by said, interpolation means on the time axis.

3. A reception method, comprising the steps of:
extracting a pilot signal from a frequency domain orthogonal frequency division multiplexing signal;
estimating a transmission line characteristic in a temporal direction based on the extracted pilot signal and producing a transmission line characteristic signal representative of the estimated transmission line characteristic:
estimating a delay profile from the transmission line characteristic signal;
producing a frequency shift amount based on the estimated delay profile and a frequency band of an, interpolation filter to be used in a frequency interpolation process;
producing a shift amount offset representing a predetermined shill amount;
adding the frequency shift amount and the shift amount offset to produce a trial shift amount;
performing frequency shifting of the frequency domain orthogonal frequency division multiplexing signal in accordance with the trial shift amount;
performing frequency shilling of the transmission line characteristic signal in accordance with the trial shift amount;
performing a frequency interpolation process for the frequency-shifted transmission line characteristic signal using the interpolation filter to produce a signal representative of the transmission line characteristics of all subcarriers;
producing, based on the frequency-shifted frequency domain orthogonal frequency division multiplexing signal and the signal produced by the frequency interpolation process, a transmission line distortion compensated signal in the form of a signal from which components of distortion of a transmission line are removed;
detecting a noise amount included in the produced transmission line distortion compensated signal;
performing a fast fourier transform operation for a time domain orthogonal frequency division multiplexing signal to produce the frequency domain orthogonal Frequency division multiplexing signal; and
detecting, when the position of the earliest incoming wave on the time axis cannot be detected from the estimated delay profile, an interval of the shift amount offset within which the detected noise amount is minimum, detecting a shift amount offset which exhibits a maximum value within the interval with reference to a center position of the delay spread which can be detected based on the delay profile and estimating the position of the earliest incoming wave on the time axis from the detected maximum shift amount offset and the frequency hand of the interpolation filter to set a start position of the fast fourier transform operation.

4. A non-transitory computer-readable storage medium with an executable program stored thereon wherein the program instructs a computer to perform the following steps of:
extracting a pilot signal from a frequency domain orthogonal frequency division multiplexing signal;
estimating a transmission line characteristic In a temporal direction based on the extracted pilot signal and producing a transmission line characteristic signal representative of the estimated transmission line characteristic;
estimating a delay profile from the transmission line characteristic signal;
producing a frequency shift amount based on the estimated delay profile and a frequency band of an interpolation filter to be used in a frequency interpolation process:
producing a shift amount offset representing a predetermined shift amount;
adding the frequency shift amount and the shill amount offset to produce a trial shift amount;
performing frequency shifting of the frequency domain orthogonal frequency division multiplexing signal in accordance with the trial shift amount;
performing frequency shifting of the transmission line characteristic, signal in accordance with the trial shift amount;
performing a frequency interpolation process for the frequency-shifted transmission line characteristic signal using the interpolation filter to produce a signal representative of the transmission line characteristics of all subcarriers;
producing, based on the frequency-shifted frequency domain orthogonal frequency division multiplexing signal and the signal produced by the frequency interpolation process, a transmission line distortion compensated signal in the form of a signal from which components of distortion of a transmission line are removed;
detecting a noise amount included in the produced transmission line distortion compensated signal;
performing a fast Fourier transform operation for a time domain orthogonal frequency division multiplexing signal to produce the frequency domain orthogonal frequency division multiplexing signal; and
detecting, when the position of the earliest incoming wave on the time axis cannot be detected from the estimated delay profile, an interval of the shift amount offset within which the detected noise amount is minimum detecting a shift amount offset which exhibits a maximum value within the interval with reference to a center position of the delay spread which can be detected based on the delay profile and estimating the position of the earliest incoming wave on the time axis from the detected maximum shift amount offset and the frequency band of the interpolation filter to set a start position of the fast fourier transform operation.

5. A reception apparatus, comprising:
an extraction section configured to extract a pilot signal from a frequency domain orthogonal frequency division multiplexing signal;
a transmission line characteristic estimation section configured to estimate a transmission line characteristic in a temporal direction based on the pilot signal extracted by said extraction section and produce a transmission line characteristic signal representative of the estimated transmission line characteristic:

an estimation section configured to estimate a delay profile from the transmission line characteristic signal produced by said transmission line characteristic estimation section;

a frequency shift amount production section configured to produce a frequency shift amount based on the delay profile estimated by said estimation section and a frequency band of an interpolation filter to be used in a frequency interpolation process;

a control section configured to produce a shift amount offset representing a predetermined shift amount;

an addition section configured to add the frequency shift amount produced by said frequency shift amount production section and the shift amount offset produced by said control section to produce a trial shift amount;

a first frequency shifting section configured to perform frequency shifting of the frequency domain orthogonal frequency division multiplexing signal in accordance with the trial shift amount produced by said addition section;

a second frequency shifting section configured to perform frequency shifting of the transmission line characteristic signal in accordance with the trial shift amount produced by said addition section;

an interpolation section configured to perform a frequency interpolation process for the transmission line characteristic signal frequency-shifted by said second frequency shifting section using said interpolation filter to produce a signal representative of the transmission line characteristics of all subcarriers;

a compensation section configured to produce, based on the frequency domain orthogonal frequency division multiplexing signal frequency-shifted by said first frequency shifting section and the signal produced by the frequency interpolation process of said interpolation section, a transmission line distortion compensated signal in the form of a signal from which components of distortion of a transmission line are removed:

a detection section configured to detect a noise amount included in the transmission line distortion compensated signal produced by said compensation section; and an operation section configured to perform a fast fourier transform operation for a time domain orthogonal frequency division multiplexing signal to produce the frequency domain orthogonal frequency division multiplexing signal;

said control section being operable, when the position of the earliest incoming wave on the time axis cannot be detected from the delay profile estimated by said estimation section, to detect an interval of the shift amount offset within which the noise amount detected by said detection section is minimum, detect a shift amount offset which exhibits a maximum value within the interval with reference to a center position of the delay spread which can be detected based on the delay profile and estimate the position of the earliest incoming wave on the lime axis from the detected maximum shift amount offset and the frequency band of the interpolation filter used by said interpolation section to set a start position of the fast fourier transform operation by said operation section.

* * * * *